(12) United States Patent
Tsubouchi et al.

(10) Patent No.: US 6,334,383 B1
(45) Date of Patent: Jan. 1, 2002

(54) VACUUM SERVO APPARATUS

(75) Inventors: Kaoru Tsubouchi, Toyota; Akihiko Miwa, Anjo, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/291,973

(22) Filed: Apr. 15, 1999

(30) Foreign Application Priority Data

Apr. 15, 1998 (JP) .......................................... 10-104739

(51) Int. Cl.$^7$ ................................................ F15B 13/16
(52) U.S. Cl. ....................................................... 91/367
(58) Field of Search .............................. 91/361, 363 R, 91/369.1, 369.2, 369.3, 367

(56) References Cited

U.S. PATENT DOCUMENTS

| | | | |
|---|---|---|---|
| 3,110,031 A | * 11/1963 | Price ..................... | 91/369.2 X |
| 5,181,769 A | 1/1993 | Schiel et al. | |
| 5,483,866 A | 1/1996 | Schlüter | |
| 5,605,088 A | * 2/1997 | Balz et al. ................. | 91/369.1 |
| 5,683,147 A | * 11/1997 | Tsubouchi et al. ........ | 303/114.3 |
| 5,845,556 A | * 12/1998 | Tsubouchi et al. ..... | 91/376 R X |
| 5,857,399 A | * 1/1999 | Tsubouchi et al. ......... | 91/369.1 |
| 6,065,388 A | * 5/2000 | Tsubouchi et al. ......... | 91/369.2 |

FOREIGN PATENT DOCUMENTS

| | | |
|---|---|---|
| DE | 1 655 429 | 11/1971 |
| DE | 39 09 924 | 9/1990 |
| DE | 195 41 534 | 5/1997 |

OTHER PUBLICATIONS

Karlheinz Bill et al., "Smart Booster–New Key Element for Brake Systems with Enhanced Function Potential", *1995 SAE International Congress and Exposition*, Detroit, MI, Feb. 27–Mar. 2, 1995, pp. 27–33.

* cited by examiner

Primary Examiner—John E. Ryznic
(74) Attorney, Agent, or Firm—Burns, Doane, Swecker & Mathis, LLP

(57) ABSTRACT

A vacuum servo apparatus capable of regulating the output accompanying the activation of an actuator to the maximum output or less includes a housing, movable walls located within the housing, a power piston, an input member, a valve mechanism, an output rod, a reaction disc and an actuator. A rear member forming part of an input member is able to move forward by a predetermined stroke with respect to a front member forming part of the input member so that the input member can be moved backward by the reaction disc in accordance with the activation of the actuator to cut off communication between rear chambers and the atmosphere.

28 Claims, 8 Drawing Sheets

VACUUM SERVO APPARATUS

This application is based on and claims priority under 35 U.S.C. §119 with respect to Japanese Application No. 10(1998)-104739 filed on Apr. 15, 1998, the entire content of which is incorporated herein by reference.

FIELD OF THE INVENTION

The present invention generally relates to a brake booster. More particularly, the present invention pertains to a vacuum type servo system to be applied to an automobile.

BACKGROUND OF THE INVENTION

U.S. Pat. No. 5,483,866 discloses a vacuum type servo system that includes a housing in which is formed at least one pressure chamber, a movable wall disposed in the housing to move forward and backward with respect to the housing for partitioning the pressure chamber into a front chamber communicating with a vacuum source and a rear chamber for selectively communicating with the front chamber and the atmosphere, a power piston jointed to the movable wall, an input member arranged in the power piston to move forward and backward with respect to the power piston, and a valve plunger member arranged in the power piston for moving forward and backward integrally with the input member. An atmospheric valve seat is arranged in the valve plunger member and a vacuum valve seat is arranged in the power piston. A control valve is defined by an atmospheric seal portion capable of moving into and out of engagement with the atmospheric valve seat to cut off communication with the rear chamber and the atmosphere upon engaging the atmospheric valve seat and to establish communication of the rear chamber with the atmosphere upon being out of engagement with the atmospheric valve seat, and a vacuum seal portion capable of moving into and out of engagement with the vacuum valve seat to cut off communication between the front chamber and the rear chamber upon engagement with the vacuum valve seat and to establish communication of the rear chamber with the front chamber upon being out of engagement with the vacuum valve seat. An output member outputs to the outside the forward force of the power piston in accordance with the movement of the movable wall. A reaction member transmits member to the output member the forward force of the power piston and an input applied to the input, and applies a reaction of a magnitude corresponding to the output of the output member to move the input member backward. An actuator brings the valve plunger member forward to move the atmospheric valve seat away from the atmospheric seal portion to thereby establish communication between the rear chamber and the atmosphere.

In this known vacuum type servo system, the valve plunger member is moved by activating the actuator separately of the operation of the input member so that the atmospheric valve seat is moved away from the atmospheric seal portion to establish communication between the rear chamber and the atmosphere and accordingly a pressure difference between the front chamber and the rear chamber. When this pressure difference is established between the front chamber and the rear chamber by the activation of the actuator, forward forces are generated at the movable wall and the power piston, and the output member outputs the forward force of the power piston to the outside.

In this vacuum type servo system, however, the flow of atmospheric air into the rear chamber by the activation of the actuator continues until the rear chamber receives the atmospheric pressure so that the output of the vacuum type servo system to be outputted from the output member in accordance with the activation of the actuator reaches a maximum.

It is conceivable that this vacuum type servo system for generating an output by activation of the actuator independently of the operation of the input member can be applied to an automatic braking system that is designed to maintain the vehicle distance, for example, at a predetermined value.

This automatic braking system is typically designed so that when the distance between a running vehicle and a proceeding vehicle becomes shorter than a predetermined distance, for example, braking action in the vehicle is achieved by activating the system without any braking operation of the driver so that the vehicle distance may be kept at a predetermined value. The automatic braking action of this automatic braking system has a tendency not to require a high braking force.

When the aforementioned vacuum type servo system is applied to an automatic braking system such as described above, the actuator is activated when the vehicle distance becomes shorter than the predetermined value. The output is thus generated in the vacuum type servo system to effect the automatic braking operation without any braking operation of the driver, i.e., without any operation of the input member.

However, the braking force to be generated at this time is based on the maximum output that is established in the vacuum type servo system and this rather strong braking force may not be well suited for the automatic braking operation in the automatic braking system. In other words, the known vacuum type servo system described above is not well suited for braking systems which do not require the generation of the maximum output of the vacuum type servo system.

In light of the foregoing, a need exists for a vacuum type servo system that is capable of regulating the output accompanying the activation of an actuator to the maximum output or less than the maximum output.

A need also exists for a vacuum type servo system which is able to control the output accompanying the activation of the actuator within a range lower than the jumping output of the performance of an ordinary brake.

SUMMARY OF THE INVENTION

A vacuum type servo system according to one aspect of the invention includes: a housing having at least one pressure chamber formed therein; a movable wall so disposed in the housing as to move forward and backward with respect to the housing for partitioning the pressure chamber into a front chamber communicating with a vacuum source and a rear chamber selected to communicate with the front chamber and the atmosphere; a power piston jointed to the movable wall; an input member so arranged in the power piston as to move forward and backward with respect to the power piston; an atmospheric valve seat arranged in the power piston for moving forward and backward integrally with the input member; a vacuum valve seat arranged in the power piston; a control valve including an atmospheric seal portion capable of coming into and going out of abutment against the atmospheric valve seat for cutting off the communication with the rear chamber and the atmosphere when it comes into abutment against the atmospheric valve seat and for establishing the communication of the rear chamber with the atmosphere when it goes out of abutment against the atmospheric valve seat, and a vacuum seal portion capable of coming into and going out of abutment against the vacuum valve seat for cutting off t-e communication between the front chamber and the rear chamber when it comes into abutment against the vacuum valve seat and for establishing the communication of the rear chamber with the front chamber when it goes out of abutment against the vacuum valve seat; an output member for outputting the forward force of the power piston in accordance with the movement of the movable wall to the outside of the system; a reaction member for transmitting the forward force of the power piston and an input fed to the input member, to the output member and for applying a reaction of a magnitude corresponding to an output of the output member, to move the input member backward; and an actuator for bringing the atmospheric valve seat and the atmospheric seal portion away from each other to establish the communication between the rear chamber and the atmosphere, wherein the input member includes: a front member for coming into abutment against the reaction member; and a rear member capable of moving integrally with the atmospheric valve seat, so that when a predetermined input is fed to the input member, the rear member moves forward by a predetermined stroke with respect to the front member, and so that when the input member is moved backward by a reaction of the reaction member in accordance with the activation of the actuator, the atmospheric valve seat and the atmospheric seal portion can come into abutment against each other to cut off communication between the rear chamber and the atmosphere.

Preferably, the input member and the reaction member are in abutment against each other in an initial state where no input is applied to the input member. The input member preferably includes: a first joint mechanism for joining the front member and the rear member when the rear member moves forward by a predetermined stroke with respect to the front member, so that the front member and the rear member may integrally move forward; and a second joint mechanism for regulating the rearmost position of the rear member with respect to the front member and for jointing the front member and the rear member, when the rear member is at the rearmost position, so that the front member and the rear member may integrally move backward.

The second joint mechanism can be arranged in one of the front member and the rear member and includes: a recess extended longitudinally and shut off at least at its rear side end portion; and an engaging portion formed on the other and so inserted into the recess as to move longitudinally. A first bias member can be provided for biasing the rear member backward. Also, a second bias member can be arranged between the front member and the rear member for biasing the rear member backward with respect to the front member.

Preferably, either the front member or the rear member includes an engaging protrusion extended longitudinally whereas the other includes an assembly hole extended longitudinally for inserting the engaging protrusion slidably.

The vacuum type servo system can further include an elastically deformable engaging member that is deformed when the input member is moved backward by the reaction of the reaction member in accordance with the activation of the actuator for allowing the backward movement of the input member. The engaging member preferably engages the input member in accordance with the forward movement of the power piston with respect to the input member by the activation of the actuator, to move the input member and the atmospheric valve seat integrally with the power piston. The engaging member can engage the input member, when the actuator is activated at the inactive time of the input member to move the power piston forward with respect to the input member, so that in accordance with the activation of the actuator at the inactive time of the input member, the input member is moved backward by the reaction of the reaction member against a restoring force accompanying the elastic deformation of the engaging member, to bring the atmospheric valve seat and the atmospheric seal portion into abutment to thereby cut off communication between the rear chamber and the atmosphere.

The engaging member can be a key member engaging the power piston for moving longitudinally by a first predetermined stroke with respect to the power piston and with the input member for moving longitudinally by a second predetermined stroke with respect to the input member, wherein the housing includes a first opposed portion opposed to and able to abut against the rear face of the key member, wherein the power piston includes: a second opposed portion opposed to and enabled to abut against the front face of the key member; and a third opposed portion opposed to and enabled to abut against the rear face of the key member, and wherein the input member includes: a fourth opposed portion opposed to and enabled to abut against the front face of the key member; and a fifth opposed portion opposed to and enabled to abut against the rear face of the key member.

The vacuum type servo system can further include: a valve seat member arranged to move forward and backward with respect to the power piston independently of the movements of the input member and adapted to abut against the vacuum seal portion of the control valve for cutting off the communication between the front chamber and the rear chamber, wherein the rear member of the input member is integrally equipped with the atmospheric valve seat, and wherein the actuator moves the valve seat member backward to bring the valve seat member into abutment against the vacuum seal portion and moves the vacuum seal portion backward to bring the atmospheric seal portion apart from the atmospheric valve seat thereby to establish the communication between the rear chamber and the atmosphere.

The drive force of the actuator can be adjusted to adjust the output from the output member. The drive force of the actuator can also be adjusted to adjust the backward movement of the valve seat member with respect to the power piston. The actuator preferably includes a solenoid connected with an electric power source for attracting and moving the valve seat member backward when it receives the electric power, so that the output from the output member can be adjusted according to the attraction of the solenoid.

The valve seat member can be adjusted in its backward movement in accordance with the attraction of the solenoid and the vacuum type servo system can further include a third bias member arranged between the valve seat member and the power piston for biasing the valve seat member forward.

Another aspect of the invention involves a vacuum type servo system that includes: a housing having at least one pressure chamber formed therein; a movable wall so disposed in the housing as to move forward and backward with respect to the housing for partitioning the pressure chamber into a front chamber communicating with a vacuum source and a rear chamber selected to communicate with the front chamber and the atmosphere; a power piston jointed to the movable wall; an input member so arranged in the power piston as to move forward and backward with respect to the power piston; an atmospheric valve seat arranged in the power piston for moving forward and backward integrally with the input member; a vacuum valve seat arranged in the power piston; a control valve including an atmospheric seal portion capable of coming into and going out of abutment against the atmospheric valve seat for cutting off the communication with the rear chamber and the atmosphere when it comes into abutment against the atmospheric valve seat and for establishing the communication of the rear chamber with the atmosphere when it goes out of abutment against the atmospheric valve seat, and a vacuum seal portion capable of coming into and going out of abutment against the vacuum valve seat for cutting off the communication between the front chamber and the rear chamber when it comes into abutment against the vacuum valve seat and for establishing the communication of the rear chamber with the front chamber when it goes out of abutment against the vacuum valve seat; an output member for outputting the forward force of the power piston in accordance with the movement of the movable wall to the outside of the system; and a reaction member for transmitting the forward force of the power piston and an input fed to the input member, to the output member and for applying a reaction of a magnitude corresponding to an output of the output member, to move the input member backward, wherein the input member includes: a front member for coming into abutment against the reaction member; and a rear member capable of moving integrally with the atmospheric valve seat, so that when a predetermined input is fed to the input member, the rear member moves forward by a predetermined stroke with respect to the front member, and so that when the input member is moved backward by a reaction of the reaction member, the atmospheric valve seat and the atmospheric seal portion can come into abutment against each other to cut off the communication between the rear chamber and the atmosphere. The front member of the input member and the reaction member preferably abut in an initial state where no input is applied to the input member.

The present invention also provides a vacuum type servo system which includes: a housing having at least one pressure chamber formed therein; a movable wall disposed in the housing to be movable forward and backward with respect to the housing for partitioning the pressure chamber into a front chamber communicating with a negative pressure source and a rear chamber selected to communicate with the front chamber and the atmosphere; a power piston jointed to the movable wall; an input member arranged in the power piston to be movable forward and backward with respect to the power piston; an atmospheric valve seat arranged in the power piston to be movable forward and backward integrally with the input member; a vacuum valve seat arranged in the power piston; a control valve including: an atmospheric seal portion capable of coming into and going out of abutment against the atmospheric valve seat for cutting off the communication with the rear chamber and the atmosphere when it comes into abutment against the atmospheric valve seat and for establishing the communication of the rear chamber with the atmosphere when it moves out of abutment against the atmospheric valve seat; and a vacuum seal portion capable of coming into and going out of abutment against the vacuum valve seat for cutting off the communication between the front chamber and the rear chamber when it comes into abutment against the vacuum valve seat and for establishing the communication of the rear chamber with the front chamber when it goes out of abutment against the vacuum valve seat; an output member for outputting a forward force of the power piston in accordance with a movement of the movable wall to the an outside of the apparatus; and an actuator for bringing the atmospheric valve seat and the atmospheric seal portion away from each other to establish the communication between the rear chamber and the atmosphere, wherein a second predetermined input force is applied to the input member to be maintained at an inactive time of the actuator, so that an output force from the output member increases to a predetermined output force, and an output force generated by an activation of the actuator can be controlled from an output force, which is smaller than the predetermined output force.

Preferably, the vacuum type servo system also includes: a reaction member for transmitting a forward force of the power piston and an input force fed to the input member, to the output member and for applying a reaction force of a magnitude corresponding to an output force of the output member, to move the input member backward, and the atmospheric valve seat and the atmospheric seal portion can come into abutment against each other to cut off the communication between the rear chamber and the atmosphere when the input member is moved backward by a reaction force of the reaction member in accordance with the activation of the actuator.

When a predetermined input is fed to the input member, the rear member moves forward by a predetermined stroke with respect to the front member. When the input member is moved backward by a reaction of the reaction member in accordance with the activation of the actuator, the atmospheric valve seat and the atmospheric seal portion can come into abutment against each other to cut off the communication between the rear chamber and the atmosphere.

According to the present invention, the input member and the reaction member are in abutment against each other in an initial state where no input is applied to the input member. Also, the front member and the rear member are joined to each other by a first joint mechanism when the rear member moves forward by a predetermined stroke with respect to the front member, so that the front member and the rear member may integrally move forward, and the rearmost position of the rear member is regulated with respect to the front member whereas the front member and the rear member are jointed to each other by a second joint mechanism, when the rear member is at the rearmost position, so that the front member and the rear member may integrally move backward.

The front member can be longitudinally or axially moved with respect to the rear member by making the engaging portion longitudinally movable in the recess, and the backward movement of the rear member with respect to the front member is regulated by the abutment between the engaging portion and the rear side wall face of the recess. The rear member is preferably biased backward by a first bias member and the rear member is biased backward with respect to the front member by a second bias member.

The front member and the rear member are preferably engaged to move longitudinally relative to each other by inserting an engaging protrusion into an assembly hole. An engaging member is also adapted to be elastically deformed when the input member is moved backward by the reaction of the reaction member in accordance with the activation of the actuator, for allowing the backward movement of the input member. The engaging member engages the input member in accordance with the forward movement, as caused by the activation of the actuator, of the power piston with respect to the input member so that the input member and the atmospheric valve seat can move integrally with the power piston. The engaging member engages the input member, when the actuator is activated at the inactive time of the input member to move the power piston forward with respect to the input member. In accordance with the activation of the actuator at the inactive time of the input member, moreover, the input member is moved backward by the reaction of the reaction member against a restoring force accompanying the elastic deformation of the engaging member, to bring the atmospheric valve seat and the atmospheric seal portion into abutment thereby to cut off the communication between the rear chamber and the atmosphere. The engaging member is preferably a key member engaging the power piston for moving longitudinally by a first predetermined stroke with respect to the power piston and with the input member for moving longitudinally by a second predetermined stroke with respect to the input member. The housing includes a first opposed portion opposed to and enabled to abut against the rear face of the key member, wherein the power piston includes, a second opposed portion opposed to and enabled to abut against the front face of the key member; and a third opposed portion opposed to and enabled to abut against the rear face of the key member. The input member includes: a fourth opposed portion opposed to and enabled to abut against the front face of the key member; and a fifth opposed portion opposed to and enabled to abut against the rear face of the key member.

The actuator is adapted to move the valve seat member backward to bring the valve seat member into abutment against the vacuum seal portion and moves the vacuum seal portion backward to bring the atmospheric seal portion apart from the atmospheric valve seat thereby to establish the communication between the rear chamber and the atmosphere. The drive force of the actuator can be adjusted to adjust the output from the output member. The drive force of the actuator is adjusted to adjust the backward movement of the valve seat member with respect to the power piston, and the output from the output member can be adjusted according to the attraction of the solenoid.

The valve seat member is designed to be adjusted in its backward movement in accordance with the attraction of the solenoid and the valve seat member is biased forward by a third bias member arranged between the valve seal member and the power piston. When a predetermined input is fed to the input member, the rear member moves forward by a predetermined stroke with respect to the front member, and so that when the input member is moved backward by a reaction of the reaction member, the atmospheric valve seat and the atmospheric seal portion can come into abutment against each other to cut off communication between the rear chamber and the atmosphere.

According to the present invention, the front member of the input member and the reaction member abut in an initial state where no input is applied to the input member. A second predetermined input force is applied to the input member to be maintained at an inactive time of the actuator, so that an output force from the output member increases to a predetermined output force, and an output force generated by an activation of the actuator can be controlled from an output force which is smaller than the predetermined output force. The atmospheric valve seat and the atmospheric seal portion are adapted to come into abutment against each other to cut off communication between the rear chamber and the atmosphere when the input member is moved backward by a reaction force of the reaction member in accordance with the activation of the actuator.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
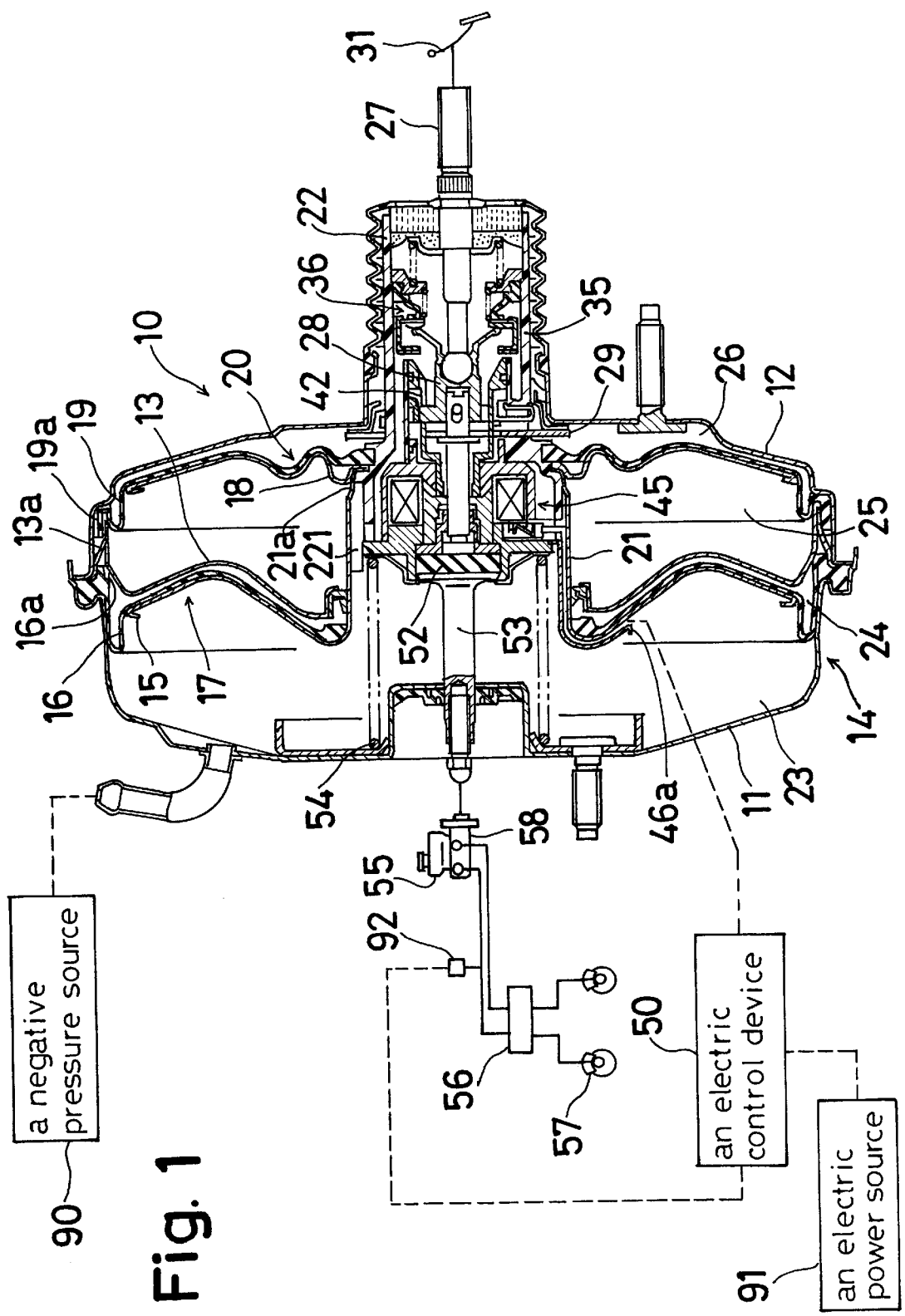
FIG. 1 is a cross-sectional view of a vacuum type servo system according to the present invention.

Referring initially to FIG. 1, the vehicular vacuum type servo system 10 of the present invention is provided with a housing 14 defined by a front shell 11, a rear shell 12 and a partition member 13 between the two shells 11, 12 for forming a front pressure chamber and a rear pressure chamber within the housing. A front movable wall 17 is movably disposed in the front pressure chamber of the housing 14 for movement in the longitudinal direction. The front movable wall 17 is composed of a front metal plate 15 and a front rubber diaphragm 16. A rear movable wall 20 is movably disposed in the rear pressure chamber for movement in the longitudinal direction. The rear movable wall 20 is composed of a rear metal plate 18 and a rear rubber diaphragm 19.

The center portion of the front plate 15 possesses a cylindrical portion 21 which is inserted in an airtight or hermetic manner for sliding movement in the center portion of the partition member 13. The front diaphragm 16 possesses a bead portion at its inner circumferential edge that is hermetically fixed in an air tight manner on the outer circumference of the front end portion of the cylindrical portion 21 of the front plate 15. The front diaphragm 16 also possesses a bead portion at its outer circumferential edge, and this bead portion is hermetically clamped in an air tight manner together with the outer circumferential edge of the partition member 13 between the outer circumferential portions of the two shells 11, 12.

The bead portion at the outer circumferential edge of the rear diaphragm 19 is hermetically clamped in an air tight manner between a folded portion formed on the radially inner side of the outer circumferential edge of the partition member 13 and the rear shell 12. A power piston 22 is inserted in an air tight and slidable manner in the center portion of the rear shell 12. The rear end of the cylindrical portion 21 of the front plate 15 and the inner circumferential edge portion of the rear plate 18 are fixed on the outer circumference of the front portion of the power piston 22. The bead portion at the inner circumferential edge of the rear diaphragm 19 is also secured in an air tight manner to the outer circumference of the front portion of the power piston 22.

As a result, the front pressure chamber in the housing 14 is partitioned into a first front chamber 23 and a first rear chamber 24, and the rear pressure chamber in the housing 14 is partitioned into a second front chamber 25 and a second rear chamber 26. The first front chamber 23 communicates with an engine intake manifold functioning as a negative pressure source 90 so that it is always kept under a negative pressure. The second front chamber 25 communicates with the first front chamber 23 through a port 21a formed in the cylindrical portion 21 of the front plate 15 and a channel 221 formed in the outer circumference of the front end portion of the power piston 22. The second front chamber 25 is thus always kept under a negative pressure.

The first rear chamber 24 communicates with the second rear chamber 26 through a channel 16a formed in the inner circumference of the bead portion at the outer circumferential edge of the front diaphragm 16, a port 13a formed in the partition member 13, and a channel 19a formed in the outer circumference of the bead portion at the outer circumferential edge of the rear diaphragm 19.

Figure 2:
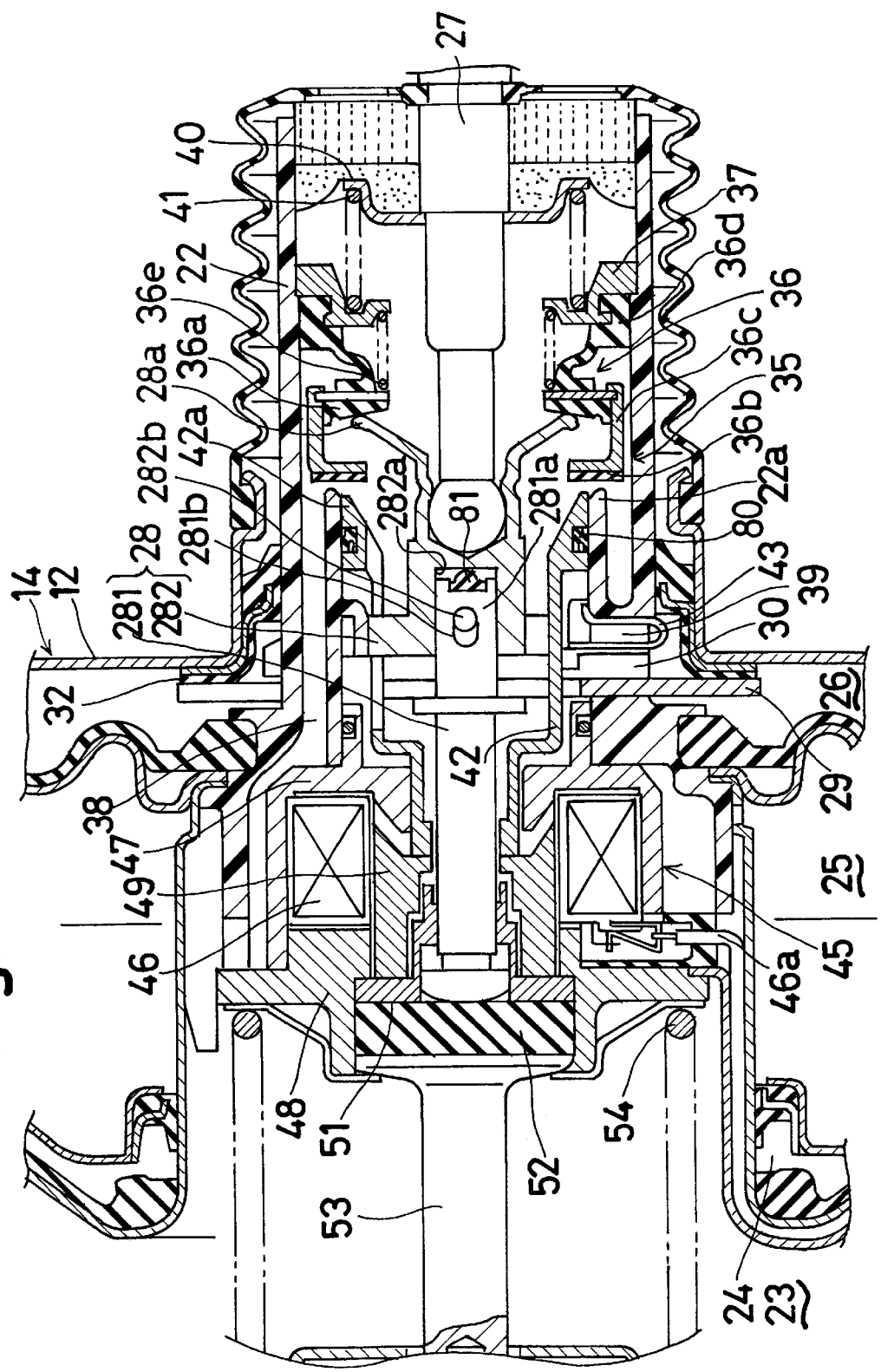
FIG. 2 is an enlarged cross-sectional view of a valve system used in the vacuum type servo system of FIG. 1.

As shown in FIGS. 1 and 2, an input rod 27 is disposed in the power piston 22 for movement back and forth with respect to the power piston 22. This input rod 27 is joined at its front end to an input member 28 by a ball joint and is joined at its rear end to a brake pedal 31. The input member 28 is guided slidably in the longitudinal directions (i.e., the right and left directions in FIG. 2) by the power piston 22.

Figure 3:
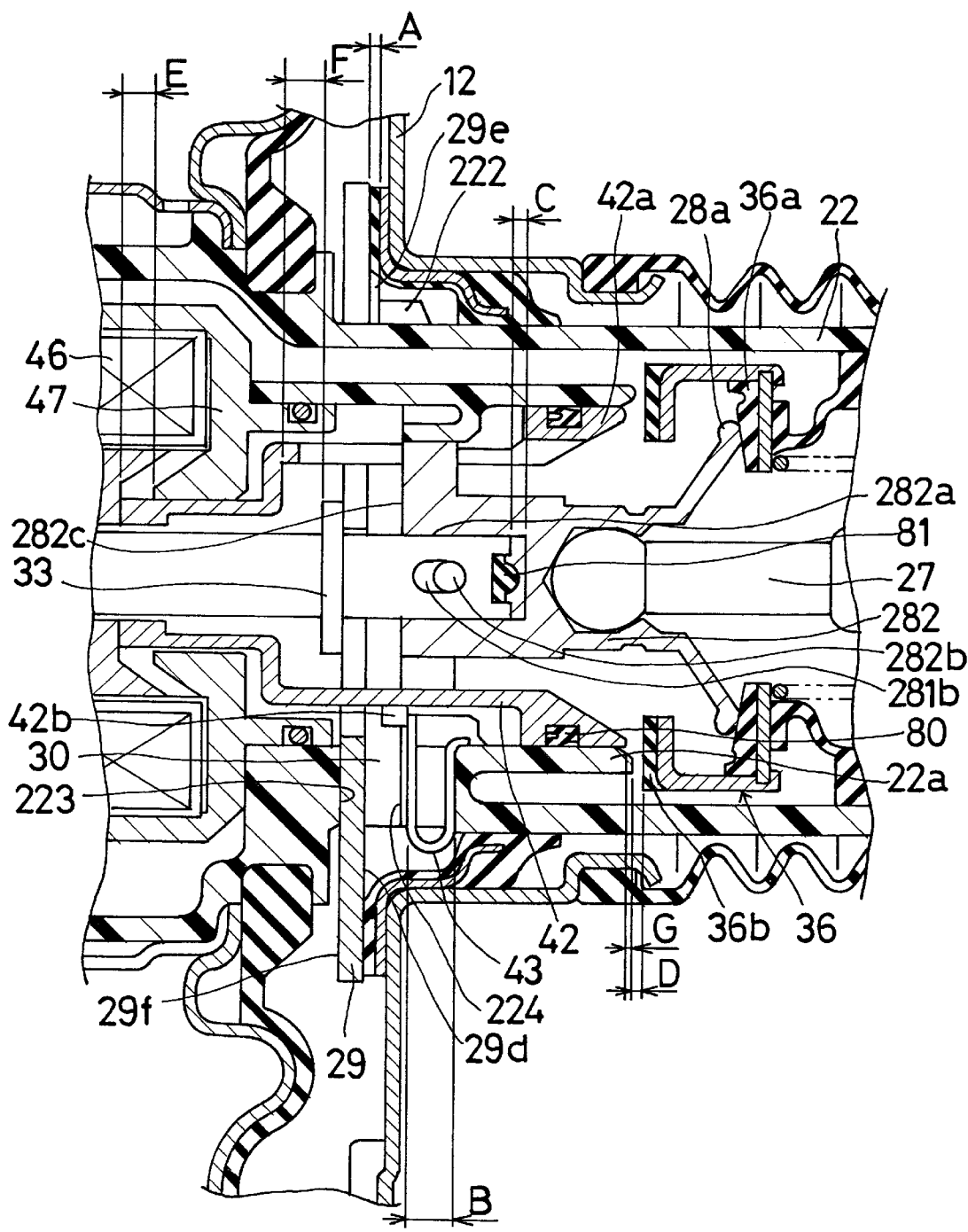
FIG. 3 is an enlarged cross-sectional view of a portion of an input member and a key member used in the vacuum type servo system of FIG. 2.

As best seen from FIGS. 2 and 3, the input member 28 has a front member 281 and a rear member 282. The rear member 282 is provided with a longitudinally extending assembly hole 282a that opens towards its front end face. The front member 281 is provided with an engaging protrusion 281a having an outer diameter substantially equal to the diameter of the assembly hole 282a. The engaging protrusion 281a is located within the assembly hole 282a and is adapted to slidably move in the longitudinal direction.

An elongated slit 281b or longitudinally extending recess is formed in the engaging protrusion 281a. This slit 281b is closed at its front and rear end portions. The rear member 282 is equipped with a radially extending pin 282b forming an engaging portion that extends from the outer circumferential portion of the assembly hole 282a through the rear member 282.

The engaging protrusion 281a of the front member 281 is inserted into the assembly hole 282a, and the pin 282b is then arranged in the rear member 282 so that the pin can move in the longitudinal direction of the slit 281b. As a result, the rear member 282 can move longitudinally with respect to the front member 281.

A rubber member 81 (or second bias means) is arranged between the rear end face of the front member 281 and the front end face of the rear member 282. The second bias member 81 can be located within a recess formed in the rear end face of the engaging protrusion 281a as shown in FIGS. 2 and 3. In an initial state shown in FIG. 3, where no input force is applied to the input member 28, the rubber member 81 urges the pin 282b into abutment against the rear wall face of the slit 281b by virtue of its elastic force and biases the rear member 282 backward with respect to the front member 281 so that the clearance between the rear end face of the engaging protrusion 281a and the bottom face of the assembly hole 282a is in the form of the distance C.

The second bias means 81 is provided for holding the front and rear members 281, 282 at expanded positions in an assembling procedure and may have a light bias force. In this embodiment, the second bias mean is exemplified by the rubber member 81 for damping the shocks at the time of abutment between the two members 281, 282.

The power piston 22 is equipped with the key member 29 for regulating the foremost position and the rearmost position of the input member 28 with respect to the power piston 22. The key member 29 is flexible and fabricated from an elastic member. As seen in FIG. 3, the key member 29 has a generally straight or flat cross-sectional configuration in the radial directions of the power piston 22 (i.e., in the vertical direction of FIG. 3). The key member 29 is located in a radial hole 30 formed in the power piston 22 and is retained by the power piston 22 so that it is not able to fall out from the power piston 22.

Figure 4:
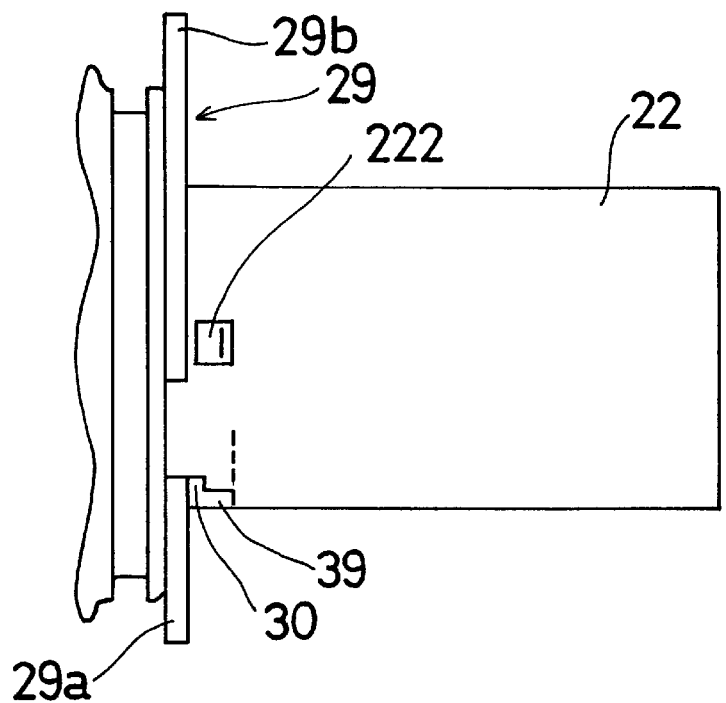
FIG. 4 is a side elevation view of a portion of a power piston used in the vacuum type servo system of FIG. 2.
Figure 5:
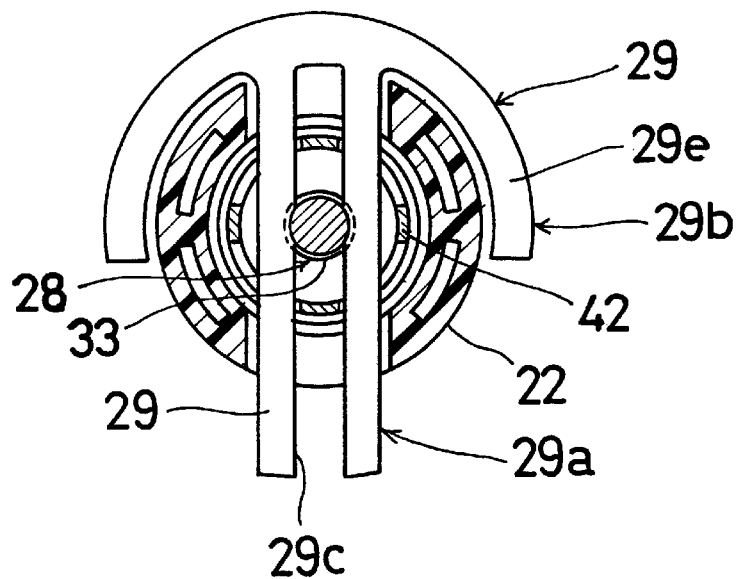
FIG. 5 is a cross-sectional view of the power piston shown in FIG. 4.

As shown in FIGS. 4 and 5, the key member 29 is integrally formed in one piece to include a flat plate portion 29a extending in the radial direction of the power piston 22 (i.e., in the vertical direction of FIGS. 4 and 5), and a semicircular arcuate portion 29b connected to one end portion of the plate portion 29a. The plate portion 29a is provided with a slit 29c that extends radially with respect to the power piston 22. This slit 29c extends from the inside of the arcuate portion 29b toward the open side of the arcuate portion 29b. The slit 29c divides the plate portion 29a into two spaced apart legs.

As seen in FIG. 3, the thickness of the key member 29 is smaller than the size of the radial hole 30 as measured in the axial or longitudinal extent. By virtue of the front face 29f of the plate portion 29a, the key member 29 is able to abut against a front wall 223 (or a second opposed portion) that opposes the front face 29f. The front wall 223 forms a part of the circumferential wall surrounding or defining the radial hole 30. By virtue of a rear face 29d of the plate portion 29a, the key member 29 is able to abut against a rear wall 224 which is opposed to the rear face 29d. The rear wall 224 forms a part of the circumferential wall defining or surrounding the radial hole 30. By virtue of a rear face 29e of the arcuate portion 29b, the key member 29 is able to abut against an engaging portion 222 (or a third opposed portion) which opposes the rear face 29e and is arranged on the outer circumferential portion of the power piston 22.

The difference between the size of the radial hole 30 in the longitudinal or axial direction (i.e., in the horizontal direction of FIG. 3) and the thickness of the key member 29 in the axial or longitudinal direction is greater than the difference between the axial distance of the front wall 223 of the radial hole 30 from the engaging portion 222 and the axial thickness of the key member 29, namely the distance A in FIG. 3. As a result, the key member 29 can move in the axial or longitudinal direction by the distance A (i.e., a first predetermined stroke) with respect to the power piston 22 as indicated in FIG. 3.

By virtue of the rear face 29e of the arcuate portion 29b, as positioned on the outer circumferential side of the power piston 22, the key member 29 is able to abut against the rear shell 12 (or a first opposed portion) through a damper member 32 which is shown in FIG. 2. The rearmost position of the power piston 22 with respect to the housing 14 is the position at which the front wall 223 of the radial hole 30 abuts against the front face 29c of the plate portion 29a of the key member 29 and the rear face 29e of the arcuate portion 29b of the key member 29 abuts against the rear shell 12.

The input member 28 is assembled in the slit 29c of the key member 29 so that the extending direction of the slit 29c and the axial direction of the input member 28 are perpendicular to each other, and the plate portion 29a is interposed between an outward flange portion 33 (or a fourth opposed portion) formed on the outer circumference of the front member 281 of the input member 28 and the front end face 282c (or a fifth opposed portion) of the rear member 282 of the input member 28. As a result, the key member 29 movably engages the input member 28 in the longitudinal or axial direction by a distance (or a second predetermined stroke) represented by the difference between the distance of the outward flange 33 from the front end face 282c and the axial thickness of the key member 29.

A first rearmost position of the input member 28 with respect to the power piston 22 is the position at which the rear face of the outward flange 33 abuts against the front face 29f of the plate portion 29a of the key member 29 and the back face 29e of the arcuate portion 29b of the key member 29 abuts against the engaging portion 222 of the power piston 22. On the other hand, the foremost position of the input member 28 with respect to the power piston 22 is the position at which the front end face 282c of the rear member 282 abuts against the rear face 29d of the plate portion 29a of the key member 29 and the front face 29f of the plate portion 29a of the key member 29 abuts against the front wall 223 of the radial hole 30.

A valve mechanism 35 is disposed in the power piston 22 for changing between, according to the longitudinal or axial position of the input member 28 with respect to the power piston 22, an output decreasing state in which the second rear chamber 26 is caused to communicate with the first front chamber 23 but is shut off from the atmosphere, an output keeping state in which the second rear chamber 26 is shut off from the first front chamber 23 and the atmosphere, and an output increasing state in which the second rear chamber 26 is shut off from the first front chamber 23 but is in communication with the atmosphere.

As best seen in FIG. 2, the valve mechanism 35 includes a generally annular atmospheric valve seat 28a formed integrally with the rear member 282 of the input member 28 and directed rearward, a generally annular vacuum valve seat 22a which is formed integrally with the power piston 22 and directed rearward, and a control valve 36. The control valve 36 is integrally provided with a generally annular atmospheric seal portion 36a that is opposed to the atmospheric valve seat 28a and able to move into and out of abutment against the atmospheric valve seat 28a, and a generally annular vacuum seal portion 36b that is opposed to the vacuum valve seat 22a and able to move into and out of abutment against the vacuum valve seat 22a.

The control valve 36 is mainly constructed of a movable portion 36c integrally provided with the atmospheric seal portion 36a and the vacuum seal portion 36b, a stationary portion 36d fixed in an airtight manner on the power piston 22 by a retainer 37, and a valve spring 36e for biasing the movable portion 36c in the forward direction.

A vacuum passage 38 and an air passage 39 are formed in the power piston 22. The vacuum passage 38 is adapted to provide communication between the valve mechanism 35 and the first front chamber 23, and the air passage 39 is adapted to provide communication between the valve mechanism 35 and the second rear chamber 26. The space in the power piston 22 and on the inner circumferential side of the stationary portion 36d of the control valve 36 is vented to the atmosphere through the rear opening of the power piston 22.

In the valve mechanism 35, when the atmospheric valve seat 28a abuts against the atmospheric seal portion 36a, the second rear chamber 26 is shut off from the atmosphere. When the atmospheric valve seat 28a is spaced apart from the atmospheric seal portion 36a, the second rear chamber 26 is in communication with the atmosphere. When the vacuum valve seat 22a abuts against the vacuum seal portion 36b, communication between the first front chamber 23 and the second rear chamber 26 is cut off. When the vacuum valve seat 22a is spaced apart from the vacuum seal portion 36b, communication between the first front chamber 23 and the second rear chamber 26 is established.

A spring 41 (i.e., a first bias member) is interposed between a retainer 40 retained on the input rod 27 and the retainer 37. This spring 41 biases the input rod 27 and accordingly the input member 28 in the backward or rearward direction to bring the atmospheric valve seat 28a into abutment against the atmospheric seal portion 36a and hold the vacuum seal member 36b in a position spaced by a distance D from the vacuum valve seat 22a when the brake pedal 31 is not depressed, that is in an initial state shown in FIG. 3.

In the power piston 22 and on the inner circumferential side of the vacuum valve seat 22a, a slider valve 42 (i.e., a valve seat member) having a generally stepped cylindrical shape is arranged movably in the longitudinal or axial direction with respect to the power piston 22. The slider valve 42 is adapted to be brought into and out of abutment against the vacuum seal portion 36b of the control valve 36 by an auxiliary vacuum valve seat 42a which is formed on a generally annular rear end portion of the slider valve 42 so that communication between the first front chamber 23 and the second rear chamber 26 is cut off when the auxiliary vacuum valve seat 42a and the vacuum seal portion 36b come into abutment against each other.

The slider valve 42 is equipped with a seal member 80 on its outer circumferential portion. The slider valve 42 abuts hermetically in an air tight manner against the inner circumferential portion of the power piston 22 through the seal member 80, with the slider valve 42 being slidable with respect to the inner circumferential portion of the power piston 22.

A spring 43 (i.e., a third bias member) is arranged between the slider valve 42 and the power piston 22. This spring 43 is disposed in the air passage 39 which extends radially (i.e., vertically in FIG. 3) in the power piston 22 to bias the slider valve 42 forward with respect to the power piston 22.

Figure 6:
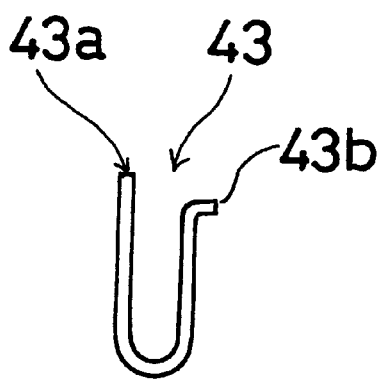
FIG. 6 is an enlarged end view of the spring shown in FIG. 3.
Figure 7:
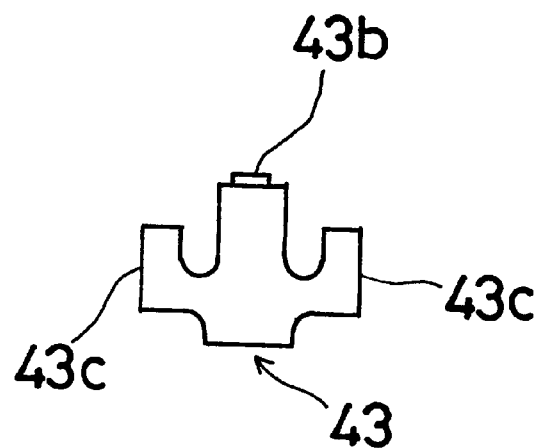
FIG. 7 is a back elevation of the spring shown in FIG. 6.
Figure 8:
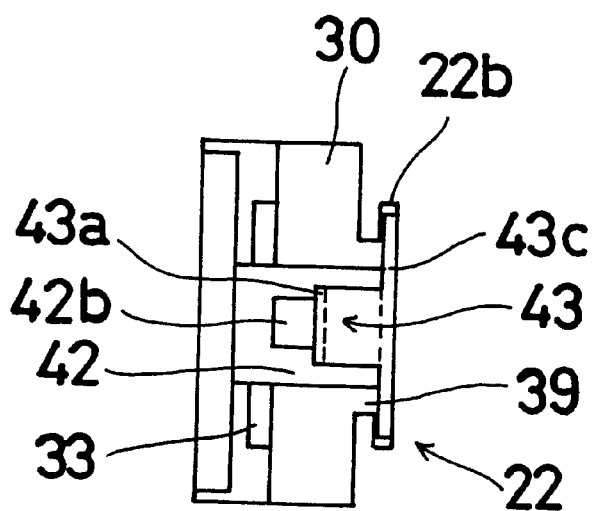
FIG. 8 is a side elevation view of a portion of the input member and key member shown in FIG. 3.

As shown in FIGS. 6–8, the spring 43 is shaped as a generally flat plate that is curved and is arranged in the air passage 39 of the power piston 22. The distance between the front face and the rear face of the spring 43 is defined by the distance B shown in FIG. 3.

The spring 43 has engaging protrusions 43c at its rear face and engages at its front open end portion 43a with an engaging portion 42b formed on the outer circumferential portion of the slider valve 42. The spring 43 also abuts at its rear face against the circumferential wall of the air passage 39 and engages at its rear open end portion 43b with the open circumferential edge portion of the air passage 39 of the power piston 22 on the side of the valve mechanism 35. The engaging protrusion 43c is assembled with an engaging groove 22b which is formed in the outer circumferential portion of the power piston 22 so that the spring 43 is fixed on the power piston 22.

As seen in FIG. 2, an actuator 45 is disposed in the front portion of the power piston 22. This actuator 45 is adapted to move the slider valve 42 backward against the biasing force of the spring 43. This actuator 45 is constructed to include a solenoid coil 46, a yoke 47 made of a magnetic material, and a yoke/reaction member accommodating member 48 made of a magnetic material.

The solenoid coil 46, the yoke 47 and the yoke/reaction member accommodating member 48 are fixed on the power piston 22, and the plunger 49 abuts at its rear face against the front end face of the slider valve 42. The solenoid coil 46 is electrically connected through a lead wire 46a with an electronic control unit 50 outside of the housing 14. The electric control unit 50 is electrically controlled by an electric power source 91.

When the solenoid coil 46 is not energized (i.e., during an inactive state of the actuator 45), the slider valve 42 is biased by the spring 43 to abut at its front end face against the plunger 49. The front end face of the plunger 49 is held at the position shown in FIG. 2 in which it is fixed with respect to the yoke/reaction member accommodating member 48 and in which it is in abutment against a guide member 51 for slidably guiding the front portion of the input member 28. The auxiliary vacuum valve seat 42a of the slider valve 42 is positioned in front of the vacuum valve seat 22a of the power piston 22 by a distance G as shown in FIG. 3.

When the solenoid coil 46 is energized (i.e., in an active state of the actuator 45), an electromagnetic force is generated between the yoke 47 and the plunger 49, and the plunger 49 is moved backward. In accordance with this backward movement of the plunger 49, the slider valve 42 is moved backward against the biasing force of the spring 43.

The maximum backward stroke of the slider valve 42 corresponds to the distance E in FIG. 3 between the yoke 47 and the plunger 49. In the backward moved state of the slider valve 42, the auxiliary vacuum valve seat 42a of the slider valve 42 is positioned rearward of the vacuum valve seat 22a of the power piston 22.

A disk type reaction disc 52 made of rubber is disposed in the yoke/reaction member accommodating member 48 and in front of the guide member 51. The rear end portion of an output rod 53 is slidably disposed ahead of the reaction disc 52. The rear end portion of the output rod 53 is hermetically inserted in an airtight and slidable manner through the center portion of the front shell 11 of the housing 14.

As is known in the art, the reaction disc 52 transmits to the output rod 53 a force for moving the power piston 22 forward and a force for moving the input member 28 forward, and applies such a reaction force of a magnitude corresponding to the output of the output rod 53 to the input member 28 as to move the input member 28 backward.

A return spring 54 is disposed in the center portion of the first front chamber 23. This return spring 54 is adapted to move the power piston 22 and the two movable walls 17, 20 coupled to the power piston 22 in the backward or rearward direction with respect to the housing 14.

The output rod 53 is operationally joined to the piston of a master cylinder 58. This master cylinder 58 is equipped with a reservoir tank 55 and is connected through liquid pressure conduits to an actuator unit 56 for the ABS (or anti-lock brake system), the TRC (or traction control) and the braking/steering controls.

Wheel cylinders 57 arranged at individual wheels are individually connected through liquid pressure conduits to the actuator unit 56. A liquid pressure sensor 92 is arranged in the liquid pressure conduit between the master cylinder 58 and the actuator unit 56. The liquid pressure sensor 92 detects the pressure in the liquid pressure conduits and accordingly in the master cylinder 58.

In the initial state shown in FIG. 3, a clearance of a distance F is established between the stepped portion on the inner circumferential side of the slider valve 42 and the front face of the front side flange portion 33 of the input member 28, while the rear face of the reaction disc 52 abuts the front end face of the front member of the input member 28. The individual clearances in FIG. 3 are set to G+D+A<E<F, E<B, A<C, D<C, and C<A+D.

Figure 9:
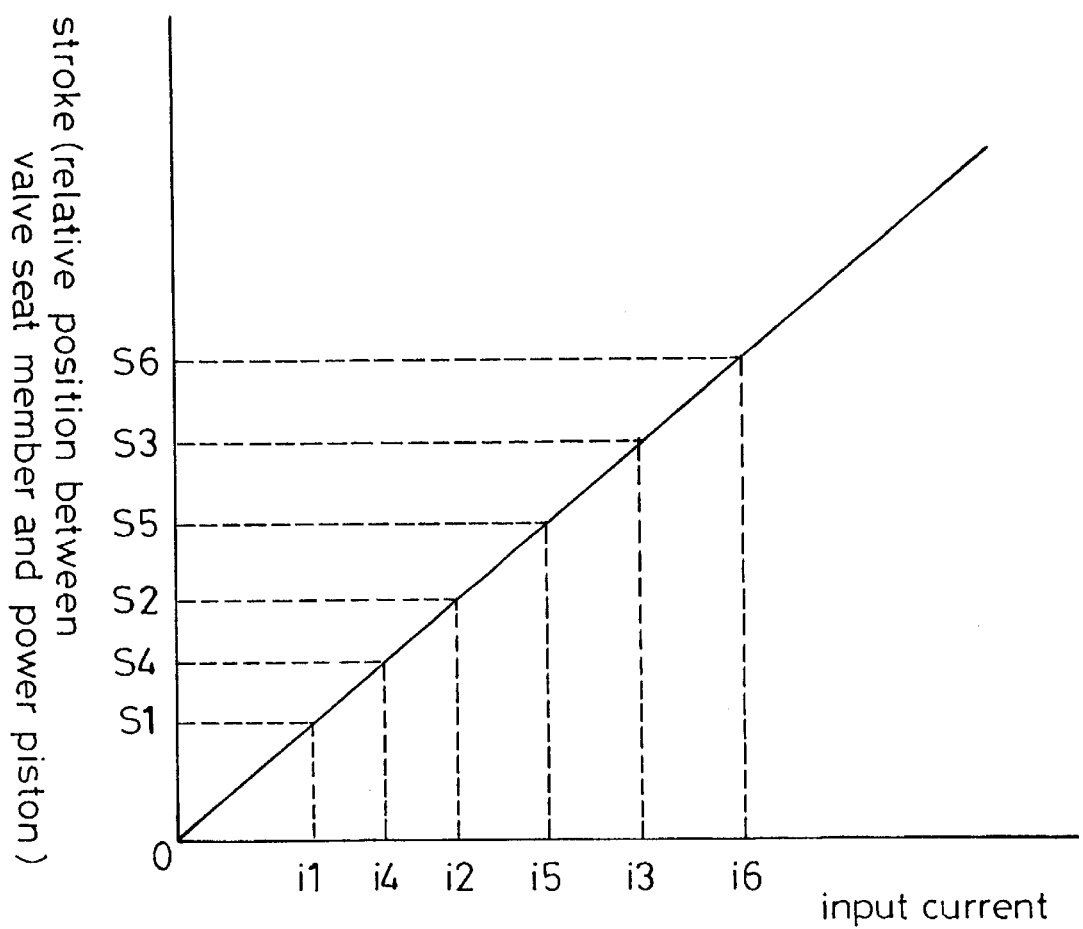
FIG. 9 is a characteristic diagram of the vacuum type servo system of the present invention illustrating relative displacement between a slider valve and the power piston against an electric current flowing through a solenoid.

FIG. 9 is a characteristic diagram of the vacuum type servo system 10 of this embodiment and plots relative displacement between the slider valve 42 and the power piston 22 against the electric current i flowing through the solenoid 46. When electric current flows through the solenoid 46, the plunger 49 and accordingly the slider valve 42 is moved backward against the biasing force of the spring 43.

An electric current i1 for the solenoid 46 is required to move the plunger 49 and the slider valve 42 backward by a distance S1 with respect to the power piston 22 against the biasing force of the spring 43. An electric current i2 for the solenoid 46 is required to move the plunger 49 and the slider valve 42 backward by a distance S2 with respect to the power piston 22 against the biasing force of the spring 43. An electric current i3 for the solenoid 46 is required to move the plunger 49 and the slider valve 42 backward by a distance S3 with respect to the power piston 22 against the biasing force of the spring 43.

On the other hand, an electric current i4 for the solenoid 46 is required to move the plunger 49 and the slider valve 42 backward by a distance S4 with respect to the power piston 22 against the biasing force of the spring 43, and an electric current i5 for the solenoid 46 is required to move the plunger 49 and the slider valve 42 backward by a distance S5 with respect to the power piston 22 against the biasing force of the spring 43. Further, an electric current i6 for the solenoid 46 is required to move the plunger 49 and the slider valve 42 backward by a distance S6 with respect to the power piston 22 against the biasing force of the spring 43.

In accordance with an increase in the electric current to be fed to the solenoid 46 and accordingly an increase in the attraction of the solenoid 46, the backward movement of the plunger 49 and the slider valve 42 with respect to the power piston 22 increases. The relative movement of the plunger 49 and the slider valve 42 to the power piston 22 depends upon the electric current fed to the solenoid 46 and accordingly upon the attraction of the solenoid 46. On the other hand, the relationship between the movement of the slider valve 42 and the individual clearances is set to (S1−G)<C.

Having described the various features and characteristics associated with the present invention, the operation will now be described. In the state shown in FIGS. 1–3, the brake pedal 31 is not depressed, and the actuator 45 is not activated. Then, during an output lowering state, the valve mechanism 35 causes the second rear chamber 26 to communicate with the first front chamber 23 while cutting off the second rear chamber 26 from the atmosphere. In this state, the atmospheric valve seat 28a abuts against the atmospheric seal portion 36a, and the vacuum valve seat 22a and the auxiliary vacuum valve seat 42a of the slider valve 42 are disengaged from the vacuum seal portion 36b so that the pressures in the first rear chamber 24 and the second rear chamber 26 are lowered to the same level as that of the pressure in the first front chamber 23.

As a result, the forward force does not act on the two movable walls 17, 20 and the power piston 22. The power piston 22 and the two movable walls 17, 20 joined to the power piston 22 are held by the return spring 54 at the rearmost position with respect to the housing 14. In this position, the front wall 223 of the radial hole 30 of the power piston 22 abuts against the front face 29f of the plate portion 29a of the key member 29 and the rear face 29e of the arcuate portion 29b of the key member 29 abuts against the rear shell 12.

Figure 10:
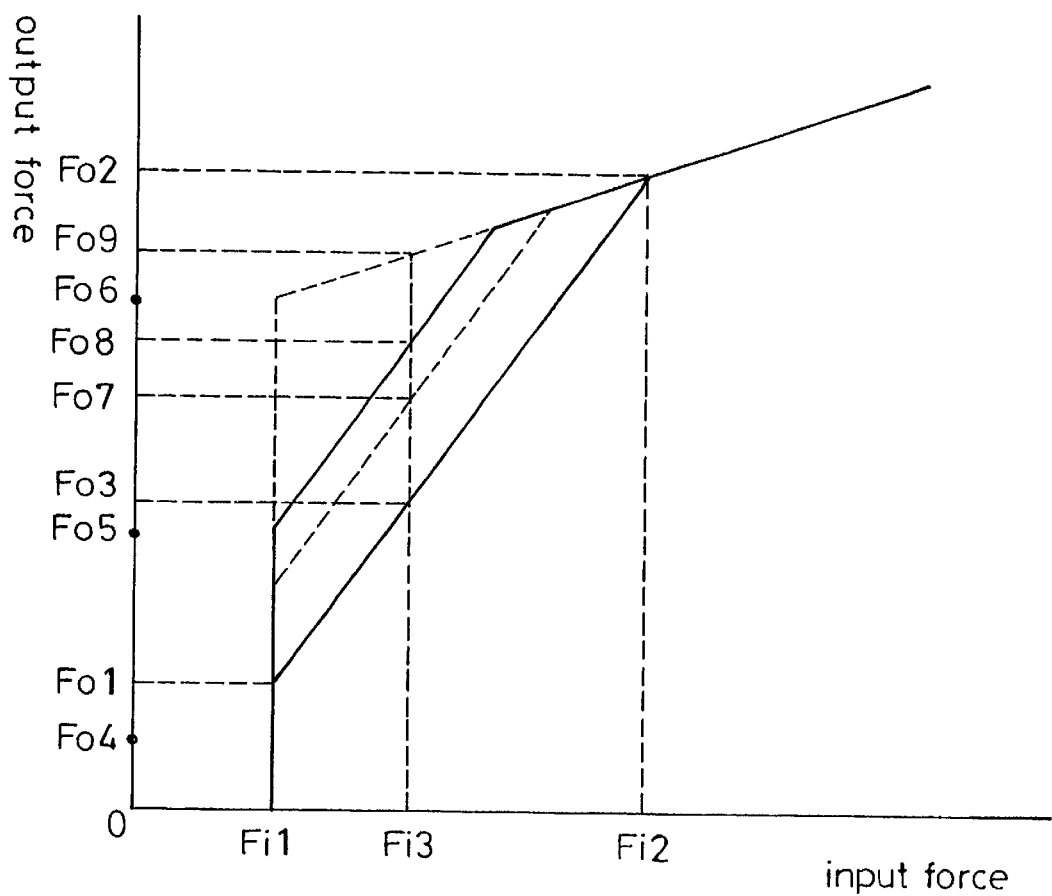
FIG. 10 is an input/output characteristic diagram of the vacuum type servo system of the present invention.

FIG. 10 is a characteristic diagram of the vacuum type servo system 10 of the present invention in which the output is plotted on the ordinate and the input is plotted on the abscissa. When the driver depresses the brake pedal 31 with an input Fi1 for an ordinary braking operation, the input rod 27 is moved forward with respect to the power piston 22.

Because the forward movement of the front member 281 of the input member 28 with respect to the power piston 22 is regulated by the reaction disc 52, the rear member 282 of the input member 28 is exclusively moved forward integrally with the input rod 27 by the forward movement of the input rod 27 so that the rear member 282 moves forward with respect to the front member 281 while compressing the rubber member 81. This forward movement of the rear member 282 with respect to the front member 281 is continued until the clearance C between the front member 281 and the rear member 282 disappears, that is until the bottom face of the assembly hole 282a comes into abutment against the open peripheral edge portion of the recess of the engaging projection 281a.

By virtue of the movement of the rear member 282 of the input member 28, the movable portion 36c of the control valve 36 is biased forward by the valve spring 36e so that it moves forward integrally with the rear member 282, and the vacuum seal portion 36b of the control valve 36 comes into abutment with the vacuum valve seat 22a of the power piston 22 to cut off communication between the vacuum passage 38 and the air passage 39 to thereby shut off the second rear chamber 26 from the first front chamber 23. In short, the valve mechanism 35 is changed from the output lowering state to the output maintaining or keeping state.

At the time when the vacuum valve seat 22a and the vacuum seal portion 36b are in engagement with one another, the input member 28 has moved forward by the distance D with respect to the power piston 22 so that a clearance of the distance (C–D) is left between the bottom face of the assembly hole 282a of the rear member 282 and the rear end face of the front member 281.

When the input rod 27 and the rear member 282 are further moved forward by a distance of a α(<(C–D)), the atmospheric valve seat 28a of the rear member 282 is moved apart from the atmospheric seal member 36a of the control valve 36 to vent the air passage 39 to the atmosphere through the clearance between the atmospheric valve seat 28a and the atmospheric seal portion 36a. The second rear chamber 26 is thus vented to the atmosphere to change the valve mechanism 35 to the output raising state. At this time, the clearance between the atmospheric valve seat 28a and the atmospheric seal portion 36a is equal to the distance α.

When the valve mechanism 35 changes to the output raising state, atmospheric air flows into the second rear chamber 26, and flows from this second rear chamber 26 into the first rear chamber 24 to raise the pressure in the two rear chambers 24, 26. A forward moving force is thus generated at the first movable wall 17 by the pressure difference between the first front chamber 23 and the first rear chamber 24. Also, a forward moving force is generated at the second movable wall 20 by the pressure difference between the second front chamber 25 and the second rear chamber 26, and a forward moving force is generated at the power piston 22 by the pressure difference between the first front chamber 23 and the second rear chamber 26.

These forward moving forces are transmitted from the power piston 22 through the yoke/reaction member accommodating member 48 of the actuator 45, the guide member 51 and the reaction disc 52 to the output rod 53 so that the two movable walls 17, 20, the power piston 22 and the output rod 53 start their integral respective forward movements with respect to the housing 14 to start the action of the master cylinder 58.

At this time, the power piston 22 moves forward with respect to the input member 28 too so that the atmospheric seal portion 36a of the control valve 36 comes close the atmospheric valve seat 28a. On the other hand, the reaction disc 52 is compressed and deformed to move into the guide member 51 by the power piston 22 and the output rod 53. The reaction disk 52 transmits the forward moving force of the power piston 22 and the forward moving force of the input member 28 to the output rod 53 and applies a reaction force, corresponding to the output of the output rod 53, to the input member 28 to thereby move the input member 28 backward with respect to the power piston 22.

At this time, a clearance of a distance (C–D–α) is present between the front member 281 and the rear member 282 of the input member 28. The front member 281 of the input member 28 is moved backward, when applied with the reaction force from the reaction disc 52, by the distance (C–D–α) with respect to the power piston 22 so that the bottom face of the assembly hole 282a of the rear member 282 comes into abutment against the open circumferential edge portion of the recess of the engaging protrusion 281a of the front member 281 to thereby regulate the relative movement between the front member 281 and the rear member 282.

When the front member 281 is further moved backward by the reaction force from the reaction disc 52, the rear member 282 and the front member 281 are integrally moved backward because the bottom face of the assembly hole 282a of the rear member 282 is in abutment against the open circumferential edge portion of the recess of the engaging protrusion 281a of the front member 281.

When the power piston 22 moves forward with respect to the input member 28 and when the input member 28 receives the reaction force from the reaction disc 52 to move backward with respect to the power piston 22, the atmospheric seal portion 36a of the control valve 36 comes into abutment against the atmospheric valve seat 28a to cut off communication between the air passage 39 and the atmosphere to thereby interrupt the flow of atmospheric air into the two rear chambers 24, 26 (i.e., the valve mechanism 35 is changed to the output maintaining or keeping state).

The backward movement of the input member 28 with respect to the power piston 22 after the abutment of the front member 281 with the rear member 282 is substantially equal to the spacing a between the atmospheric valve seat 28a and the atmospheric seal portion 36a, and the extrusion of the reaction disc 52 towards the guide member 51 after the abutment between the front member 281 and the rear member 282 is substantially equal to the value α. Therefore, the total of the extrusions of the reaction disc 52 is substantially equal to the distance (C–D)

At this time, the input as applied from the brake pedal 31 to the input member 28 takes the value Fi1 as a second predetermined input force indicated in FIG. 10, and the output to be applied from the output rod 53 to the master cylinder 58 takes the value Fo1 as a predetermined output force as also indicated in FIG. 10. In other words, for the constant input value Fi1, there occurs a transfer, increase, or "jumping" of the output value from 0 to Fo1.

The output Fo1 accompanying the "jumping" (or the jumping output) depends upon the extrusion or movement of the reaction disc 52 to the guide member 51 and is generally equal to the distance (C–D), that is the difference between the spacing C in the initial state between the front member 281 and the rear member 282 of the input member 28 and the spacing D in the initial state between the vacuum valve seat 22a and the vacuum seal portion 36b.

At this time, in the input member 28, the bottom face of the assembly hole 282a of the rear remember 262 is still in abutment against the open circumferential edge portion of the recess of the engaging protrusion 281a of the front member 281 so that the input member 28 is shortened by the distance C in its longitudinal or axial length.

If the input to be applied from the brake pedal 31 to the input member 28, when the output Fo1 is generated so that the valve mechanism 35 is in the output keeping state, is increased to a value less than a value Fi2 as seen in FIG. 10, the rear member 282 and the front member 281 integrally move forward with respect to the power piston 22. That is, the input member 28 moves forward with respect to the power piston 22 so that the atmospheric valve seat 28a once again moves away from the atmospheric seal portion 36a of the control valve 36 (i.e., the valve mechanism 35 changes to the output raising state). As a result, atmospheric air flows into the two rear chambers 24, 26 to raise the pressure in the rear chambers 24, 26, and the forward moving forces of the movable walls 17, 20 and the power piston 22 are increased so that the two movable walls 17, 20, the power piston 22 and the output rod 53 further move forward with respect to the housing 14.

On the other hand, when the power piston 22 moves forward with respect to the input member 28 and when the reaction disc 52 applies the reaction force to the input member 28 in accordance with the forward movement of the power piston 22 to move the front member 281 and the rear member 282 integrally (i.e., the input member 28 moves backward), the atmospheric seal portion 36a of the control valve 36 comes close to the atmospheric valve seat 28a. Before long, the atmospheric valve seat 28a engages or abuts against the atmospheric seal portion 36a of the control valve 36 to interrupt the flow of atmospheric air into the two rear chambers 24, 26 (i.e., the valve mechanism 35 is changed to the output keeping state), thereby interrupting the increased forward moving forces of the two movable walls 17, 20 and the power piston 22.

If the input to be applied from the brake pedal 31 to the input member 28 is reduced to a value larger than the value Fi1 in FIG. 10 when the valve mechanism 35 is in the output keeping state, the input member 28 is moved backward with respect to the power piston 22. In accordance with this backward movement of the input member 28, the movable portion 36c of the control valve 36 is moved backward with respect to the power piston 22 so that the vacuum seal portion 36b moves away from the vacuum valve seat 22a (i.e., the valve mechanism 35 is changed to the output lowering state).

When the vacuum valve seat 22a is spaced apart from the vacuum seal portion 36b, the vacuum passage 38 communicates with the air passage 39 through the clearance between the vacuum valve seat 22a and the vacuum seal portion 36b and the clearance between the auxiliary vacuum valve seat 42a and the vacuum seal portion 36b so that the two rear chambers 24, 26 communicate with the first front chamber 23 to release the atmospheric air in the two rear chambers 24, 26 to the vacuum source through the first front chamber 23 to thereby lower the pressure in the two rear chambers 24, 26.

As a result, the forward moving forces of the two movable walls 17, 20 and the power piston 22 decrease so that the movable walls 17, 20, the power piston 22 and the output rod 53 are moved backward with respect to the housing 14. At this time, the power piston 22 is also moved backward with respect to the input member 28 so that the vacuum valve seat 22a comes close to the vacuum seal portion 36b of the control valve 36. Before long, the vacuum valve seat 22a comes into abutment against the vacuum seal portion 36b to interrupt the flow of atmospheric air from the two rear chambers 24, 26 to the first front chamber 23 (i.e., the valve mechanism 35 is changed to the output keeping state) to thereby interrupt the decreases in the forward moving forces of the two movable walls 17, 20 and the power piston 22.

The input value Fi2 in FIG. 10 indicates the value at which the two rear chambers 24, 26 are under atmospheric pressure. Within the range of input values from Fi1 to Fi2, the change in the output to be delivered from the output rod 53 to the master cylinder 58 is larger than that of the input to be applied to the input member 28. The ratio of the output to the input is equal to that of the area of the rear face of the reaction disc 52 to the abutting area between the rear face of the reaction disc 52 and the front end face of the input member 28.

In FIG. 10, the output is at a value Fo2 for the input value Fi2. When the input is further increased from the value Fi2, the output increases by the increase in the input. Here, as shown in FIG. 10, the change in the power per unit length of the ordinate is larger than that in the power per unit length of the abscissa. If the change in the power per unit length of the ordinate and the change in the power per unit length of the abscissa are equally drawn, the line plotting the correlation between the input and the output when the input is higher than the value Fi2 would possess a gradient of 45 degrees.

When the brake pedal 31 is depressed so that the input member 28, the movable walls 17, 20, the power piston 22 and the output rod 53 move forward with respect to the housing 14, the rear face 29e of the arcuate portion 29b of the key member 29 is spaced apart from the rear shell 12. When the valve mechanism 35 is in the output keeping stage, the distance between the rear face 29e of the arcuate portion 29b of the key member 29 and the engaging portion 222 of the power piston 22 is equal to (A+D), so that the input member 28 can move backward by the distance (A+D) from the power piston 22 with respect to the first rearmost position.

If the driver releases the depressing operation by gradually reducing the input to the brake pedal 31 so as to release the ordinary braking operation when the vacuum type servo system 10 outputs an output Fo3 for an input Fi3 so that the valve mechanism 35 is in the output keeping state, the front member 281 and the rear member 282 of the input member 28 are integrally moved backward by the reaction force applied from the reaction disc 52 and the biasing force of the spring 41.

When this backward movement of the input member 28 reaches the distance (A+D), the input member 28 is moved backward to the first rearmost position with respect to the power piston 22, that is the position at which the rear face of the front flange portion 33 abuts against the front face 29c of the plate portion 29a of the key member 29 and the rear face 29e of the arcuate portion 29b of the key member 29 abuts against the engaging portion 222 of the power piston 22.

As a result, the movable portion 36c of the control valve 36 is moved backward with respect to the power piston 22 so that the vacuum seal portion 36b is moved away from the vacuum valve seat 22a by the distance (A+D) (i.e., the valve mechanism 35 is changed to the output lowering state). As a result, the atmosphere in the two rear chambers 24, 26 is released through the first front chamber 23 by the vacuum source so that the two movable walls 17, 20, the power piston 22 and the output rod 53 are moved backward with respect to the housing 14 in accordance with the reduction in the pressure of the two rear chambers 24, 26.

At this time, the input to the brake pedal 31 and accordingly the input member 28 is gradually reduced to move the input member 28 gradually backward so that the power piston 22 and the input member 28 move backward at substantially the same speeds. In accordance with the backward movement of the power piston 22, the input member 28 is moved backward substantially integrally with the power piston 22 while maintaining the first rearmost position with respect to the power piston 22.

By virtue of the backward movements of the input member 28, the two movable walls 17, 20, the power piston 22 and the output rod 53 with respect to the housing 14, the rear face 29e of the arcuate portion 29b of the key member 29 is brought into abutment against the rear shell 12 to interrupt the backward movement of the front member 281 of the input member 28 with respect to the housing 14.

In contrast, the backward movement of the rear member 282 of the input member 28 with respect to the front member 281 continues until the pin 282b of the rear member 282 comes into abutment against the rear wall face of the slit 281b of the front member 281. The backward movements of the two movable walls 17, 20, the power piston 22 and the output rod 53 with respect to the housing 14 continues to the rearmost position of the power piston 22 with respect to the housing 14, that is the position at which the front wall 223 of the radial hole 30 of the power piston 22 abuts against the front face 29c of the plate portion 29a of the key member 29 and the rear face 29e of the arcuate portion 29b of the key member 29 abuts against the rear shell 12.

As a result, the vacuum valve seat 22a of the power piston 22 comes close to the vacuum seal portion 36b of the control valve 36 to establish the inactive state in which a small clearance is left between the vacuum valve seat 22a and the vacuum seal portion 36b.

Because of the small clearance between the vacuum valve seat 22a and the vacuum seal portion 36b, the forward movement of the input member 28 that is required for the valve mechanism 35 to change at the next action time from the output lowering state through the output keeping state to the output raising state is small so that the play at the time of depressing the brake pedal 31 can be reduced to improve the responsiveness.

Here, the reaction disc 52 is returned to the state shown in FIG. 2 by its own elasticity because the force to be transmitted between the power piston 22 and the output rod 53 is lowered or removed.

If the driver releases the depressing operation by quickly reducing the input to the brake pedal 31 to release the ordinary braking operation when the vacuum type servo system 10 outputs an output Fo3 for an input Fi3 so that the valve mechanism 35 is in the output keeping state, the input member 28 is at first moved backward by the reaction force from the reaction disc 52 and by the biasing force of the spring 41 through the input rod 27 to the first rearmost position with respect to the power piston 22. That is, the input member 28 is moved to the position at which the rear face of the front flange portion 33 abuts against the front face 29c of the plate portion 29a of the key member 29 and the rear face 29e of the arcuate portion 29b of the key member 29 abuts against the engaging portion 222 of the power piston 22.

As a result, the vacuum valve seat 22a and the vacuum seal portion 36b are spaced apart by the distance (A+D), and the atmospheric air in the two rear chambers 24, 26 is released through the first front chamber 23 by the vacuum source so that the two movable walls 17, 20, the power piston 22 and the output rod 53 are moved backward with respect to the housing 14 in accordance with the reduction in the pressure of the two rear chambers 24, 26.

At this time, the input to the brake pedal 31 and accordingly the input member 28 is quickly lowered so that the backward movement of the input member 28 is effected more quickly than that of the power piston 22. As a result, the input member 28 is moved far backward from the state of the first rearmost position by the reaction force of the reaction disc 52 and the biasing force of the spring 41 while warping or bending the plate portion 29a of the key member 29 backward on the engaging portion 222 of the power piston 22 more than the arcuate portion 29b of the key member 29.

As a result, the input member 28 is moved backward quite far from the first rearmost position so that the vacuum valve seat 22a and the vacuum seal portion 36b are spaced apart more than the distance (A+D). This spacing between the vacuum valve seat 22a and the vacuum seal portion 36b is thus increased to release the atmospheric air in the two rear chamber 24, 26 promptly through the first front chamber 23 by the vacuum source so that the input member 28, the two movable walls 17, 20, the power piston 22 and the output rod 53 are quickly moved backward with respect to the housing 14 in response to the prompt pressure drop in the two rear chambers 24, 26.

By virtue of the backward movements of the input member 28, the two movable walls 17, 20, the power piston 22 and the output rod 53 with respect to the housing 14, the rear face 29e of the arcuate portion 29b of the key member 29 is brought into abutment against the rear shell 12 to interrupt the backward movement of the front member 281 of the input member 28 with respect to the housing 14.

In contrast, the backward movement of the rear member 282 of the input member 28 with respect to the front member 281 is continued until the pin 282b of the rear member 282 comes into abutment against the rear wall face of the slit 281b in the front member 281. The backward movements of the two movable walls 17, 20, the power piston 22 and the output rod 53 with respect to the housing 14 are continued to the rearmost position of the power piston 22 with respect to the housing 14, that is the position at which the front wall 223 of the radial hole 30 of the power piston 22 abuts against the front face 29c of the plate portion 29a of the key member 29 and the rear face 29e of the arcuate portion 29b of the key member 29 abuts against the rear shell 12. The input member 28 is moved forward integrally with the front member 281 and the rear member 282 by the restoring force of the plate portion 29a of the key member 29.

In accordance with the return of the plate portion 29a of the key member 29 to the initial state and the backward movements of the two movable walls 17, 20, the power piston 22 and the output rod 53, the front face 29c of the plate portion 29a and the front wall 223 of the radial hole 30 of the power piston 22 come into abutment so that the power piston 22 and accordingly the two movable walls 17, 20 and the output rod 53 are restored to their initial positions. As a result, the vacuum valve seat 22a of the power piston 22 and the vacuum seal portion 36b of the control valve 36 come close to each other to establish the inactive state in which a small clearance is left between the vacuum valve seat 22a and the vacuum seal portion 36b.

If the backward warpage or bending of the plate portion 29a of the key member 29 with respect to the arcuate portion 29b of the key member 29 increases at the time of further backward movement of the input member 26 from the first rearmost position, the rear face 29d of the plate portion 29a comes into abutment against the rear wall 224 of the radial hole 30 of the power piston 22. When the plate portion 29a abuts against the rear wall 224, it cannot warp or bend backward any further with respect to the arcuate portion 29b so that the backward movement of the input member 28 is regulated.

Specifically, the position at which the rear face 29e of the arcuate portion 29b of the key member 29 abuts against the engaging portion 222 of the power piston 22, at which the rear face of the front flange portion 33 abuts against the front face 29c of the plate portion 29a of the key member 29, and at which the rear face 29d of the plate portion 29a abuts against the rear wall 224 of the radial hole 30 of the power piston 22, is located at a second rearmost position of the input member 28 with respect to the power piston 22.

The slider valve 42 is arranged independently of the input member 28 so that it exerts no action on the input member 28 when this input member 28 moves forward. Similarly, the spring 43 which biases the slider valve 42 forward does not exert any action on the input member 28.

In accordance with the present invention, the input force enabling elastic deformation of the rubber member 81 corresponds to a first predetermined input force.

The vehicle can be equipped with a vehicle distance sensor for detecting that the distance between the vehicle and the preceding vehicle. If the vehicle distance sensor detects, while the vehicle is running, that the distance to the preceding vehicle is shorter than a predetermined value, for example, the electronic control unit 50 causes an automatic braking operation to activate the actuator 45 on the basis of the detected result of the vehicle distance sensor. In this situation, the brake pedal 31, the input rod 27 and the input member 28 are not operated by the driver and the actuator 45 is activated without any input.

When the electronic control unit 50 energizes the solenoid coil 46 with the electric current i1 on the basis of the detection result of the vehicle distance sensor, an electromagnetic attraction force is established between the plunger 49 and the yoke 47 so that the plunger 49 is moved backward by the distance S1 (>D+G) with respect to the power piston 22 against the biasing force of the spring 43 through the slider valve 42. In accordance with this backward movement of the plunger 49, the slider valve 42 is also moved backward by the distance S1 with respect to the power piston 22.

By virtue of the backward movement of the slider valve 42, the auxiliary vacuum valve seat 42a of the slider valve 42 is brought into abutment against the vacuum seal portion 36b of the control valve 36 to cut off communication between the vacuum passage 38 and the air passage 39 to thereby cut off communication between the first front chamber 23 and the second rear chamber 26. Moreover, the slider valve 42 moves the movable portion 36c of the control valve 36 backward against the biasing force of the valve spring 36e to move the atmospheric valve seat 28a out of engagement with the atmospheric seal portion 36a.

The spacing at this time between the atmospheric valve seat 28a and the atmospheric seal portion 36a is equal to (S1−D−G). In addition, this spacing (S1−D−G) between the atmospheric valve seat 28 and the atmospheric seal portion 36a is larger than the distance A.

As a result, atmospheric air flows into the two rear chambers 24, 26 through the clearance between the atmospheric valve seat 28a and the atmospheric seal portion 36a and through the air passage 39 to raise the pressure in the two rear chambers 24, 26 so that the two movable walls 17, 20, the power piston 22 and the output rod 53 move forward with respect to the housing 14. In accordance with the forward movement of the power piston 22, the slider valve 42 is biased forward by the power piston 22 through the spring 43 so that the slider valve 42 is moved integrally with the power piston 22 when it moves backward by the distance S1 from the initial state with respect to the power piston 22 while the auxiliary vacuum valve seat 42a is in abutment against the vacuum seal portion 36b.

Because the spacing (S1−D−G) between the atmospheric valve seat 28a and the atmospheric seal portion 36a is larger than the distance A between the rear face 29e of the arcuate portion 29b of the key member 29 and the engaging portion 222 of the power piston 22, the power piston 22 moves forward with respect to the housing 14, the input member 28 and the key member 29 so that the engaging portion 222 of the power piston 22 comes into abutment against the rear face 29e of the arcuate portion 29b of the key member 29.

When the power piston 22 moves forward by the distance A with respect to the housing 14, the input member 28 and the key member 29 so that the engaging portion 222 comes into abutment against the rear face 29e of the key member 29, the atmospheric seal portion 36a of the control valve 36 comes close to the atmospheric valve seat 28a of the input member 28 as the power piston 22 moves forward. Because the spacing (S1−D−G) between the atmospheric valve seat 28a and the atmospheric seal portion 36a is larger than the distance A between the rear face 29e of the arcuate portion 29b of the key member 29 and the engaging portion 222 of the power piston 22, as described above, the atmospheric valve seat 28a and the atmospheric seal portion 36a are still spaced apart by the distance (S1−D−G−A)

By this forward movement of the power piston 22 with respect to the input member 28, on the other hand, a clearance of distance A is established between the front end face of the front member 281 and the rear face of the reaction disc 52. As a result, atmospheric air continuously flows into the second rear chamber 26 and further into the first rear chamber 24 to increase the pressure differential between the two front chambers 23, 25 and the two rear chambers 24, 26 so that the two movable walls 17, 20 and the power piston 22 move further forward. As a result of the further forward movement of the power piston 22 after the abutment between the engaging portion 222 of the power piston 22 and the rear face 29e of the arcuate portion 29b of the key member 29, the front face 29c of the plate portion 29a of the key member 29 and the rear face of the outward flange portion 33 of the front member 281 of the input member 28 are kept in abutment against each other so that the front member 281 is moved forward integrally with the power piston 22 through the key member 29.

Because the rear wall face of the slit 281b of the front member 281 and the pin 282b of the rear member 282 are in abutment against each other, the rear member 282 is moved forward integrally with the front member 281 against the biasing force of the spring 41 in accordance with the forward movement of the front member 281. In short, the input member 28 is moved forward integrally with the power piston 22, and the input rod 27 is also moved forward by the forward movement of the input member 28.

Because the power piston 22 and the input member 28 move forward integrally with each other, the atmospheric valve seat 28a formed on the input member 28 and the atmospheric seal portion 36a of the control valve 36, as moved forward integrally with the power piston 22, are kept out of abutment. On the other hand, the clearance between the reaction disc 52 and the front member 281 is kept at the distance A.

The forward moving forces of the two movable walls 17, 20 and the power piston 22 are transmitted from the power piston 22 through the yoke/reaction member accommodating member 48 of the actuator 45, the guide member 51 and the reaction disc 52 to the output rod 53 so that the two movable walls 17, 20, the power piston 22 and the output rod 53 start their integrated forward movements with respect to the housing 14 to thereby start the operation of the master cylinder 58.

At this time, the reaction disc 52 extrudes or is deformed into the guide member 51 to reduce the clearance distance A between the rear face of the center portion of the guide member 51 and the front end face of the front member 281 of the input member 28, with the reaction disc 52 abutting against the front end face of the input member 28 so that the reaction force corresponding to the output of the output rod 53 is applied to move the input member 28 backward with respect to the power piston 22.

Here, the rear face of the outward flange portion 33 of the input member 28 is in abutment against the front face 29c of the plate portion 29a of the key member 29, and the rear face 29e of the arcuate portion 29b of the key member 29 is in abutment with the engaging portion 222 of the power piston 22. As a result, the reaction disc 52 moves the front member 281 of the input member 28 backward with respect to the power piston 22 and the rear member 282 while elastically deforming the key member 29.

The reaction disc 52 warps or bends the plate portion 29a of the key member 29 backward on the engaging portion 222 of the power piston 22 with respect to the arcuate portion 29b of the key member 29 and moves the front member 281 of the input member 28 backward. In short, the reaction disc 52 moves the front member 281 backward against the restoring force of the plate portion 29a of the key member 29. The reaction force from the reaction disc 52 at this time is sufficiently high in comparison with the restoring force of the key member 29.

When the front member 281 receives the reaction force from the reaction disc 52, the front member 281 compresses and deforms the rubber member 81 between itself and the rear member 282, and is moved backward with respect to the rear member 282 while eliminating the engagement between the pin 282b and the rear wall face of the slit 282a so that the pin 282b is able to move forward in the slit 282a with respect to the front member 281.

The backward movement of the front member 281 with respect to the rear member 282 eliminates engagement between the front member 281 and the rear member 282 as to restrict the rearmost position of the rear member 282 with respect to the front member 281 so that the rear member 282 can move backward with respect to the front member 281. The rear member 282 is moved backward to the rearmost position with respect to the front member 281 by the restoring force of the rubber member 81 and the biasing force of the spring 41. The front member 281 thus receives the reaction force from the reaction disc 52 so that the front member 281 and the rear member 282 are substantially integrally moved backward with respect to the power piston 22.

The input member 28 is fed with the reaction force from the reaction disc 52 to move backward by the distance (S1–D–G–A) while deforming the key member 29. Before long, the atmospheric seal portion 36a of the control valve 36 comes again into abutment with the atmospheric valve seat 28a to interrupt the flow of atmospheric air into the two rear chambers 24, 26. The valve mechanism 35 is thus changed to the power keeping state.

At this time, the input applied from the brake pedal 31 to the input member 28 is 0 as shown in FIG. 10, and the output applied from the output rod 53 to the master cylinder 58 is Fo4, as also shown in FIG. 10.

In addition, the extrusion or deformation of the reaction disc 52 towards the guide member 51 at this time is equal to the distance (S1–D–G). The extrusion or deformation of the reaction disc 52 towards the guide member 51 at the time when the output Fo1 for the input Fi1 during the ordinary braking operation is equal to the distance (C–D). Because the relationship (S1–G)<C is set, as has been described above, the extrusion or deformation of the reaction disc 52 towards the guide member 51 in the individual states have a relation of (SI–D–G)<(C–D). In short, the output corresponding to the extrusion or deformation (C–D) of the reaction disc 52 is Fo1, and the output corresponding to the extrusion or deformation (SI–D–G) of the reaction disc 52 is Fo4, so that these individual outputs have a relationship of Fo4<Fo1.

If the electric current to the solenoid 46 increases from i1 to i2 when the output Fo4 is produced to bring the valve mechanism 35 into the output keeping state, the plunger 49 and accordingly the slider valve 42 is further moved backward by the distance (S2–S1) with respect to power piston 22. When the slider valve 42 moves backward, the movable portion 36c of the control valve 36 is moved backward while maintaining the abutting state between the auxiliary vacuum valve seat 42a of the slider valve 42 and the vacuum seal portion 36b of the control valve 36, and so the atmospheric valve seat 28a is brought away from the atmospheric seal portion 36a of the control valve 36.

The spacing at this time between the atmospheric valve seat 28a and the atmospheric seal portion 36a is equal to the distance (S2–S1). As a result, atmospheric air flows into the two rear chambers 24, 26 to raise the pressure in the two rear chambers 24, 26 so that the two movable walls 17, 20, the power piston 22 and the output rod 53 are moved forward with respect to the housing 14.

The forward moving forces of the two movable walls 17, 20 and the power piston 22 are transmitted from the power piston 22 through the yoke/reaction member accommodating member 48 of the actuator 45, the guide member 51 and the reaction disc 52 to the output rod 53 so that the two movable walls 17, 20, the power piston 22 and the output rod 53 start their integrated forward movements with respect to the housing 14 to thereby start the action of the master cylinder 58.

At this time, the reaction disc 52 deforms into the guide member 51 to reduce the clearance between the rear face of its center portion and the front end face of the input member 28, and abuts against the front end face of the input member 28 so that the reaction force corresponding to the output of the output rod 53 is applied to move the input member 28 backward with respect to the power piston 22. Also, the rear face of the outward flange portion 33 of the input member 28 is in abutment against the front face 29c of the plate portion 29a of the key member 29, and the rear face 29e of the arcuate portion 29b of the key member 29 is in abutment against the engaging portion 222 of the power piston 22. As a result, the reaction disc 52 moves the input member 28 backward while elastically deforming the key member 29. The reaction force from the reaction disc 52 at this time is sufficiently high in comparison with the restoring force of the key member 29.

The reaction disc 52 warps or bends the plate portion 29a further backward on the engaging portion 222 of the power piston 22 with respect to the arcuate portion 29b of the key member 29 and moves the input member 28 backward. The reaction disc 52 thus moves the input member 28 backward against the biasing or restoring force of the key member 29.

In accordance with the forward movement of the power piston 22, the atmospheric seal portion 36a of the control valve 36 is moved forward with respect to the atmospheric valve seat 28a, and the input member 28 is fed with the reaction from the reaction disc 52 to move backward. Before long, the atmospheric seal portion 36a of the control valve 36 again comes into abutment with the atmospheric valve seat 28a to interrupt the flow of atmospheric air into the two rear chambers 24, 26. The valve mechanism 35 is thus changed to the output keeping or maintaining state.

At this time, the input as applied from the brake pedal 31 to the input member 28 is 0 as shown in FIG. 10, and the output applied from the output rod 53 to the master cylinder 58 is Fo5 as also shown in FIG. 10. From the state of the output Fo4 for the input 0, the electric current to the solenoid 46 is changed from i1 to i2 so that the output is increased from Fo4 to Fo5.

If the electric current to the solenoid 46 is increased from i2 to i3 when the output Fo5 is produced to bring the valve mechanism 35 into the output keeping state, the plunger 49 and accordingly the slider valve 42 is moved further backward by the distance (S3–S2) with respect to power piston 22. When the slider valve 42 moves backward, the movable portion 36c of the control valve 36 is moved backward while maintaining the abutting state between the auxiliary vacuum valve seat 42a of the slider valve 42 and the vacuum seal portion 36b of the control valve 36 so that the atmospheric valve seat 28a is moved away from the atmospheric seal portion 36a of the control valve 36.

The spacing at this time between the atmospheric valve seat 28a and the atmospheric seal portion 36a is equal to the distance (S3–S2). As a result, atmospheric air flows into the two rear chambers 24, 26 to raise the pressure in the two rear chambers 24, 26 so that the two movable walls 17, 20, the power piston 22 and the output rod 53 are moved forward with respect to the housing 14.

The forward moving forces of the two movable walls 17, 20 and the power piston 22 are transmitted from the power piston 22 through the yoke/reaction member accommodating member 48 of the actuator 45, the guide member 51 and the reaction disc 52 to the output rod 53 so that the two movable walls 17, 20, the power piston 22 and the output rod 53 start their integrated forward movements with respect to the housing 14 to thereby start the action of the master cylinder 58.

At this time, the reaction disc 52 goes into or deforms into the guide member 51 to reduce the clearance between the rear face of its center portion and the front end face of the input member 28, and abuts against the front end face of the input member 28 so that the reaction corresponding to the output of the output rod 53 is applied to move the input member 28 backward with respect to the power piston 22. The rear face of the outward flange portion 33 of the input member 28 is in abutment against the front face 29c of the plate portion 29a of the key member 29, and the rear face 29e of the arcuate portion 29b of the key member 29 is in abutment against the engaging portion 222 of the power piston 22. As a result, the reaction disc 52 moves the input member 28 backward while elastically deforming the key member 29. The reaction from the reaction disc 52 at this time is sufficiently high in comparison with the restoring force of the key member 29.

The reaction disc 52 warps or bends the plate portion 29a of the key member 29 further backward on the engaging portion 222 of the power piston 22 with respect to the arcuate portion 29b of the key member 29 and moves the input member 28 backward. The reaction disc 52 thus moves the input member 28 backward against the biasing force of the key member 29.

When the key member 29 is elastically deformed by the reaction force received through the input member 28 from the reaction disc 52, however, the rear face 29d of the plate portion 29a of the key member 29 comes into abutment against the rear wall face 224 of the radial hole 30 of the power piston 22. When the rear face 29d of the plate portion 29a abuts against the rear wall face 224 of the radial hole 30, the plate portion 29a can no longer warp or bend backward with respect to the arcuate portion 29b. Thus, the input member 28 takes the second rearmost position with respect to the power piston 22 so that the backward movement of the input member 28 is regulated by the key member 29.

Because the backward movement of the input member 28 with respect to the power piston 22 is regulated, the spaced state of the atmospheric valve seat 28a and the atmospheric seal portion 36a, that is the output raising state of the valve mechanism 35, is continued so that atmospheric air continuously flows into the two rear chambers 24, 26. As a result, the two movable walls 17, 20 and the power piston 22 continue their forward movements until the two rear chambers 24, 26 reach atmospheric pressure so that the output is continuously produced from the output rod 53.

When the two rear chambers 24, 26 reach atmospheric pressure, atmospheric air no longer flows into the two rear chambers 24, 26 to interrupt the forward movements of the two movable walls 17, 20 and the power piston 22 and accordingly the forward movement of the output rod 53.

At this time, the input as applied from the brake pedal 31 to the input member 28 is 0 as shown in FIG. 10, and the output applied from the output rod 53 to the master cylinder 58 is Fo6 as also shown in FIG. 10. From the state of the output Fo5 for the input at 0, the electric current to the solenoid 46 is changed from i2 to i3 so that the output is increased from Fo5 to Fo6. The output Fo6 to be generated by the vacuum type servo system 10 is the maximum output in the automatic braking operation.

The output at the automatic braking time in the vacuum type servo system 10 depends on not only the electric current fed to the solenoid 46 but also the restoring force accompanying the elastic deformation of the key member 29. Specifically, the output during the automatic braking time is raised if the restoring force of the key member 29 is raised and is lowered if the restoring force of the key member 29 is lowered. The output value during automatic braking is within the range from 0 to the output value Fo6 indicating that the two rear chambers 24, 26 have reached atmospheric pressure.

If the condition for deenergizing the solenoid coil 46 holds, that is the vehicle distance sensor detects that the distance to the proceeding vehicle has been restored to a predetermined value while the vacuum type servo system 10 is generating the output Fo6 in the output keeping state of the valve mechanism 35, the electronic control unit 50 deenergizes the solenoid coil 46 on the basis of the detection result of the vehicle distance sensor.

As a result, the slider valve 42 and the plunger 49 are returned by the spring 43 to the position shown in FIG. 2. As the plunger 49 and the slider valve 42 are restored their initial positions, the auxiliary vacuum valve seat 42a of the slider valve 42 moves away from the vacuum seal portion 36b so that communication between the first front chamber 23 and the second rear chamber 26 is established through the vacuum passage 38, the clearance between the vacuum valve seat 22a and the vacuum seal portion 36b, the clearance between the auxiliary vacuum valve seat 42a and the vacuum seal portion 36b and the air passage 39.

As a result, the atmosphere in the two rear chambers 24, 26 flows through the first rear chamber 23 into the vacuum source to reduce the pressure difference between the two front chambers 23, 25 and the two rear chambers 24, 26. Because the pressure difference between the two front chambers 23, 25 and the two rear chambers 24, 26 is thus reduced, the two movable walls 17, 20 and the power piston 22 are biased backward to their initial positions by the return spring 54.

In accordance with the backward movement of the power piston 22, the key member 29, the input member 28 and the input rod 27 are integrally moved backward with the power piston 22 by the biasing force of the spring 41. The backward movements of the power piston 22 and the input member 28 are effected while the valve mechanism 35 maintains the output lowering state so that the initial state shown in FIG. 2 is finally restored by way of the restoration of the key member 29 and by way of such forward movements of the input member 28 and the input rod 27 with respect to the power piston 22 as accompany the restorations of the key member 29.

When the driver depresses the brake pedal 31 quickly with the input Fi3 for an emergency braking operation, for example, the input member 28 is moved forward with respect to the power piston 22 so that the valve mechanism 35 is changed from the output lowering state through the output keeping state into the output raising state, as has been described above in connection with the ordinary braking operation. Then, atmospheric air flows into the two rear chambers 24, 26 so that the two movable walls 17, 20, the power piston 22 and the output rod 53 start their forward movements with respect to the housing 14. Before long, the input Fi3 to the input member 28 and the reaction force from the reaction disc 52 are balanced so that the valve mechanism 35 assumes the output keeping state to produce the output Fo3.

The distance between the rear face 29e of the arcuate portion 29b of the key member 29 for the valve mechanism 35 in the output keeping state and the engaging portion 222 of the power piston 22 is equal to (A+D). In respect of the first rearmost position, more specifically, the input member 28 is able to move backward by the distance (A+D) with respect to the power piston 22.

On the other hand, the reaction disc 52 extrudes or deforms into the guide member 51 and abuts against the front end face of the front member 281 of the input member 28. In addition, the rubber member 81 is compressed by the front member 281 and the rear member 282, and the open circumferential edge portion of the recess of the front member 281 and the bottom face of the assembly hole 282a of the front member 281 are in abutment against each other.

When the depression of the brake pedal 31 in terms of the input Fi3 is detected as the quick braking operation by a depression rate detecting means associated with the brake pedal 31 for detecting the rate of depression of the brake pedal, the solenoid coil 46 is energized with the electric current i4 by the electronic control unit 50 for the quick braking operation from the state in which the valve mechanism 35 is in the output keeping state.

As a result, the electromagnetic attraction is established between the plunger 49 and the yoke 47 so that the plunger 49 is moved backward by the distance S4 with respect to the power piston 22. In accordance with this backward movement of the plunger 49, the slider valve 42 is also moved backward by the distance S4 with respect to the power piston 22. By virtue of the backward movement of the slider valve 42, the auxiliary vacuum valve seat 42a of the slider valve 42 is brought into abutment against the vacuum seal portion 36b of the control valve 36 to cut off communication between the first front chamber 23 and the second rear chamber 26. Moreover, the slider valve 42 moves the movable portion 36c of the control valve 36 backward against the biasing force of the valve spring 36e to move the vacuum valve seat 22a away from the vacuum seal portion 36b and the atmospheric valve seat 28a away from the atmospheric seal portion 36a by the distance (S4–G).

Thus, the vacuum seal portion 36b of the control valve 36 is moved away from the vacuum valve seat 22a of the power piston 22. Because the auxiliary vacuum valve seat 42a of the slider valve 42 is in abutment against the vacuum seal portion 36b, however, the atmospheric valve seat 28a and the atmospheric seal portion 36a of the control valve 36 are brought away from each other while cutting off communication between the two rear chambers 24, 26 and the two front chambers 23, 25.

As a result, atmospheric air further flows into the two rear chambers 24, 26 to further raise the pressure in the two rear chambers 24, 26 so that the two movable walls 17, 20, the power piston 22 and the output rod 53 move forward with respect to the housing 14. In accordance with the forward movement of the power piston 22, the slider valve 42 is biased forward by the power piston 22 through the spring 43 so that it is moved forward integrally with the power piston 22 when it moves backward by the distance S4 from the initial state with respect to the power piston 22 while the auxiliary vacuum valve seat 42a is in abutment against the vacuum seal portion 36b.

When the power piston 22 moves forward with respect to the input member 28 and the key member 29, the atmospheric seal portion 36a of the control valve 36 comes close to the atmospheric valve seat 28a, and the engaging portion 222 of the power piston 22 comes close to the rear face 25e of the arcuate portion 29b of the key member 29. On the other hand, the reaction disc 52 moves or deforms further into the guide member 53 to apply the reaction to the front member 281 of the input member 28 to thereby move the front member 281 backward.

As the front member 281 is moved backward with respect to the power piston 22 by the reaction force from the reaction disc 52, the open circumferential edge portion of the recess of the front member 281 and the bottom face of the assembly hole 282a of the front member 281 come into abutment against each other so that the rear member 282 is also moved backward integrally with the front member 281 with respect to the power piston 22. The input member 28 is thus moved backward while being longitudinally shortened by the distance C with respect to the power piston 22 by the reaction force from the reaction disc 52.

Because the distance (S4–G) is larger at this time than the distance (A+D), the rear face 29e of the arcuate portion 29b of the key member 29 comes into abutment against the engaging portion 222 of the power piston 22 at the time of the forward movement of the power piston 22 with respect to the input member 28 and the key member 29 and the backward movement of the input member 28 by the reaction disc 52, before the abutment of the atmospheric valve seat 28a against the atmospheric seal portion 36a.

As a result, the rear face of the outward flange portion 33 of the input member 28 comes into abutment against the front face 29c of the plate portion 29a of the key member 29, and the rear face 29e of the arcuate portion 29b of the key member 29 comes into abutment against the engaging portion 222 of the power piston 22. The reaction disc 52 thus moves the input member 28 backward while elastically deforming the key member 29.

The reaction disc 52 warps or bends the plate portion 29a backward on the engaging portion 222 of the power piston 22 with respect to the arcuate portion 29b of the key member 29 and moves the input member 28 backward. The reaction disc 52 thus moves the input member 28 backward against the restoring force of the plate portion 29a of the key member 29. The reaction force from the reaction disc 52 at this time is sufficiently high in comparison with the restoring force of the key member 29.

In accordance with the forward movement of the power piston 22, the atmospheric seal portion 36a is moved forward with respect to the atmospheric valve seat 28a, and the input member 28 receives the reaction force from the reaction disc 52 to move backward. Before long, the atmospheric seal portion 36a of the control valve 36 again comes into abutment against the atmospheric valve seat 28a to interrupt the flow of atmospheric air into the two rear chambers 24, 26. The valve mechanism 35 is thus changed to the output keeping state.

The longitudinal position of the input member 28 with respect to the power piston 22 when the valve mechanism 35 is in the output keeping state is shifted backward by the distance (S4–G) with respect to the longitudinal position when the valve mechanism 35 is in the output keeping state for the input Fi3 in the ordinary braking operation, and the intrusion or deformation of the reaction disc 52 into the guide member 51 is larger than that for the ordinary braking operation.

At this time, the input, as applied from the brake pedal 31 to the input member 28, is Fi3, as shown in FIG. 10, and the output to be applied from the output rod 53 to the master cylinder 58 is at Fo7, as shown in FIG. 10. In other words, the output Fo7 higher than the output Fo3 is generated for the input Fi3 corresponding to the output Fo3 in the ordinary braking operation.

If the electric current fed to the solenoid 46 increases from i4 to i5 when the output Fo7 is produced to bring the valve mechanism 35 into the output keeping state, the slider valve 42 is further moved backward by the distance (S5–S4) with respect to power piston 22. When the slider valve 42 moves backward, the movable portion 36c of the control valve 36 is moved backward while keeping the abutting state between the auxiliary vacuum valve seat 42a of the slider valve 42 and the vacuum seal portion 36b of the control valve 36 so that the atmospheric valve seat 28a is moved away from the atmospheric seal portion 36a of the control valve 36.

The spacing at this time between the atmospheric valve seat 28a and the atmospheric seal portion 36a is equal to the distance (S5–S4). As a result, atmospheric air flows into the two rear chambers 24, 26 to raise the pressure in the two rear chambers 24, 26 so that the two movable walls 17, 20, the power piston 22 and the output rod 53 are moved forward with respect to the housing 14.

The forward moving forces of the two movable walls 17, 20 and the power piston 22 are transmitted from the power piston 22 through the yoke/reaction member accommodating member 48 of the actuator 45, the guide member 51 and the reaction disc 52 to the output rod 53 so that the two movable walls 17, 20, the power piston 22 and the output rod 53 start their integrated forward movements with respect to the housing 14 to thereby start the operation of the master cylinder 58.

At this time, the reaction disc 52 moves into or is deformed into the guide member 51 to reduce the clearance between the rear face of its center portion and the front end face of the input member 28, with the reaction disc 52 abutting against the front end face of the input member 28 so that the reaction corresponding to the output of the output rod 53 is applied to move the input member 28 backward with respect to the power piston 22. The reaction force from the reaction disc 52 at this time is sufficiently high in comparison with the restoring force of the key member 29.

At this time, the rear face of the outward flange portion 33 of the input member 28 is in abutment against the front face 29c of the plate portion 29a of the key member 29, and the rear face 29e of the arcuate portion 29b of the key member 29 is in abutment against the engaging portion 222 of the power piston 22. As a result, the reaction disc 52 moves the input member 28 backward while elastically deforming the key member 29.

The reaction disc 52 warps or bends the plate portion 29a further backward on the engaging portion 222 of the power piston 22 with respect to the arcuate portion 29b of the key member 29 and moves the input member 28 backward. In short, the reaction disc 52 moves the input member 28 backward against the biasing force or the restoring force of the key member 29.

In accordance with the forward movement of the power piston 22, the atmospheric seal portion 36a of the control valve 36 is moved forward with respect to the atmospheric valve seat 28a, and the input member 28 receives the reaction from the reaction disc 52 to move backward. Before long, the atmospheric seal portion 36a of the control valve 36 again comes into abutment against the atmospheric valve seat 28a to interrupt the flow of atmospheric air into the two rear chambers 24, 26. The valve mechanism 35 is thus changed to the output keeping state.

At this time, the input as applied from the brake pedal 31 to the input member 28 is Fi3 as shown in FIG. 10, and the output to be applied from the output rod 53 to the master cylinder 58 is Fo8 as shown in FIG. 10. Specifically, from the state of the output Fo7 for the input at Fi3, the electric current to the solenoid 46 is changed from i4 to i5 so that the output is increased from Fo1 to Fo8. In other words, the output Fo8 higher than the output Fo3 is generated for the input Fi3 corresponding to the output Fo3 in the ordinary braking operation.

If the electric current fed to the solenoid 46 increases from i5 to i6 when the output Fo8 is produced to bring the valve mechanism 35 into the output keeping state, the plunger 49 and accordingly the slider valve 42 is further moved backward by the distance (S6–S5) with respect to power piston 22. When the slider valve 42 moves backward, the movable portion 36c of the control valve 36 is moved backward while maintaining the abutting state between the auxiliary vacuum valve seat 42a of the slider valve 42 and the vacuum seal portion 36b of the control valve 36 so that the atmospheric valve seat 28a is moved away from the atmospheric seal portion 36a of the control valve 36.

The spacing at this time between the atmospheric valve seat 28a and the atmospheric seal portion 36a is equal to the distance (S6–S5). As a result, atmospheric air flows into the two rear chambers 24, 26 to raise the pressure in the two rear chambers 24, 26 so that the two movable walls 17, 20, the power piston 22 and the output rod 53 are moved forward with respect to the housing 14.

The forward moving forces of the two movable walls 17, 20 and the power piston 22 are transmitted from the power piston 22 through the yoke/reaction member accommodating member 48 of the actuator 45, the guide member 51 and the reaction disc 52 to the output rod 53 so that the two movable walls 17, 20, the power piston 22 and the output rod 53 start their integrated forward movements with respect to the housing 14 to thereby start the operation of the master cylinder 58.

At this time, the reaction disc 52 goes into or deforms into the guide member 51 to reduce the clearance between the rear face of its center portion and the front end face of the input member 28, and abuts against the front end face of the input member 28 so that the reaction corresponding to the output of the output rod 53 is applied to move the input member 28 backward with respect to the power piston 22.

At this time, the rear face of the outward flange portion 33 of the input member 28 is in abutment against the front face 29c of the plate portion 29a of the key member 29, and the rear face 29e of the arcuate portion 29b of the key member 29 is in abutment against the engaging portion 222 of the power piston 22. As a result, the reaction disc 52 moves the input member 28 backward while elastically deforming the key member 29.

The reaction disc 52 warps or bends the plate portion 29a further backward on the engaging portion 222 of the power piston 22 with respect to the arcuate portion 29b of the key member 29 and moves the input member 28 backward. The reaction disc 52 thus moves the input member 28 backward against the biasing force of the key member 29.

When the key member 29 is elastically deformed by the reaction force received through the input member 28 from the reaction disc 52, however, the rear face 29d of the plate portion 29a of the key member 29 comes into abutment against the rear wall face 224 of the radial hole 30 of the power piston 22. When the rear face 29d of the plate portion 29a abuts against the rear wall face 224 of the radial hole 30, the plate portion 29a can no longer warp or bend backward with respect to the arcuate portion 29b. As a result, the backward movement of the input member 28 is regulated by the key member 29.

Because the backward movement of the input member 28 with respect to the power piston 22 is regulated, the spaced state of the atmospheric valve seat 28a and the atmospheric seal portion 36a, that is the output raising state of the valve mechanism 35, is continued so that atmospheric air continuously flows into the two rear chambers 24, 26. As a result, the two movable walls 17, 20 and the power piston 22 continue their forward movements until the two rear chambers 24, 26 reach atmospheric pressure so that the output is continuously produced from the output rod 53.

When the two rear chambers 24, 26 reach atmospheric pressure, atmospheric air no longer flows into the two rear chambers 24, 26 to interrupt the forward movements of the two movable walls 17, 20 and the power piston 22 and accordingly the forward movement of the output rod 53.

At this time, the input as applied from the brake pedal 31 to the input member 28 is Fi3 as shown in FIG. 10, and the output to be applied from the output rod 53 to the master cylinder 58 is Fo9 as also shown in FIG. 10. Thus, from the state of the output Fo8 for the input Fi3, the electric current to the solenoid 46 is changed from i5 to i6 so that the output is increased from Fo8 to Fo9. In other words, the output Fo9 higher than the output Fo3 is generated for the input Fi3 corresponding to the output Fo3 in the ordinary braking operation. The output Fo9 to be generated by the vacuum type servo system 10 is the maximum output for the input Fi3 in the quick braking operation.

In the state where the solenoid coil 46 is energized with the electric current i6 so that the vacuum type servo system 10 generates the output Fo9 and so that the valve mechanism 35 is in the output keeping state, for example, no braking operation is required in which the driver releases the depression of the brake pedal 31. Then, the input rod 27 and accordingly the input member 28 are moved backward with respect to the power piston 22 by the reaction force from the reaction disc 52 and by the spring 41 as when the depression of the brake pedal 31 is released in the ordinary braking operation.

By virtue of this backward movement of the input member 28, the auxiliary vacuum valve seat 42a of the slider valve 42 is moved away from the vacuum seal portion 36b of the control valve 36 so that the valve mechanism 35 is changed to the output lowering state to lower the pressure in the two rear chambers 24, 26 to thereby reduce the output. As a result, the input member 28, the two movable walls 17, 20, the power piston 22 and the output rod 53 are moved backward with respect to the housing 14 until the inactive state shown in FIGS. 1–3 is finally restored.

The electronic control unit 50 deenergizes the solenoid coil 46 when the condition for this deenergization holds. As a result, the slider valve 42 and the plunger 49 are returned to the positions shown in FIG. 2 by the coil spring 43.

The actuator 45 can be controlled by the electronic control unit 50 on the basis of the detection result of the liquid pressure sensor 51 that indicates the liquid pressure of the master cylinder 58. Accordingly, the output of the vacuum type servo system 10 to the master cylinder 58 may be a desired pressure or output.

According to the vacuum type servo system 10 of the present invention, when the automatic braking operation is carried out from the state of zero output to the output Fo4, for example, this output Fo4 can be made lower than the maximum output Fo6 in the automatic braking operation and further than the output Fo2 in the "jumping" operation. In short, it is possible to control the output force generated by the actuation of the actuator 45 from Fo4 that is smaller than Fo1 as a jumping force, and to set an output value which can better match the automatic braking operation.

In the initial state in which the front end face of the input member 28 abuts against the rear face of the reaction disc 52, moreover, the rear member 282 can be moved forward with respect to the front member 281 by applying the input Fi1 (or a predetermined input) to the brake pedal 31 and accordingly the input member 28, so that the atmospheric valve seat 28a and the atmospheric seal portion 36a can be brought away from each other to ensure the "jumping" operation of the vacuum type servo system 10.

Moreover, the front member 281 and the rear member 282 can be longitudinally moved relative to each other by inserting the engaging protrusion 281a slidably into the assembly hole 282a. At the same time, the front member 281 and the rear member 282 are always in a coaxial engagement so that the input from the brake pedal 31 and the input rod 27 can be reliably transmitted to the reaction disc 52.

Moreover, the front member 281 and the rear member 282 are so engaged by the slit 281b and the pin 282b as to move longitudinally relative to each other and to regulate the rearmost position of the rear member 282 with respect to the front member 281. Also, the front member 281 and the rear member 282 are so engaged by the rear end face of the engaging protrusion 281a and the bottom face of the assembly hole 282a as to regulate the foremost position of the rear member 282 with respect to the front member 281 so that the relative movements between the front member 281 and the rear member 282 can be made accurate. This makes it possible to accurately establish the spacing between the atmospheric valve seat 28a and the atmospheric seal portion 36a, thus more accurately establishing the output of the vacuum type servo system 10.

By providing the rubber member 81, moreover, it is possible to suppress the chattering between the front member 281 and the rear member 282. Also, the spring 41 helps to ensure the movement of the rear member 282 to the rearmost position with respect to the front member 281 especially in the automatic braking operation.

By adjusting the electric current fed to the solenoid 46 of the actuator 45, it is possible to adjust the attraction to be established at the solenoid 46, that is the drive force of the actuator 45. By making the drive force of the actuator 45 adjustable, it is possible to adjust the longitudinal movement of the slider valve 42 and accordingly the output to be established from the output rod 53 in accordance with the action of the actuator 45 to thereby establish an output better matching the situations.

By arranging the spring 43 in the air passage 39, it is possible to make effective use of the space in the power piston 22, thereby helping to reduce the size of the power piston 22.

According to the present invention, it is possible to regulate the atmospheric pressure in the two rear chambers 24, 26 by causing the valve mechanism 35 to maintain the output keeping state by forward movement of the power piston 22 with respect to the input member 28 and by backward movement of the input member 28 by the reaction disk 52 with respect to the power piston 22 at the action time of the actuator 45 in the state of no operation to the brake pedal 31 and to the input member 28 (i.e., the automatic braking time). It is also possible to easily set the output during automatic braking by setting the restoring force of the key member 29 to suppress the backward movement of the input member 28 by the reaction disc 52 with respect to the power piston 22.

It is also possible to make the vacuum type servo system 10 of a simple construction by constructing an engaging member of the key member 29 to be elastically deformed when the reaction disc 52 moves the input member 28 backward in accordance with the action of the actuator 45 to allow the backward movement of the input member 28.

When the input to the brake pedal 31 and the input member 28 in the ordinary braking operation is quickly lowered, it is possible to effect a quicker output reduction and return of the vacuum type servo system 10.

By suitably adjusting the electric current fed to the solenoid 46, it is possible to make exhibit desirable input/output characteristics according to the action of the actuator 45 of the vacuum type servo system 10.

Also, by making the key member 29 bias the input member 28 forward when the reaction disc 52 moves the input member 28 backward according to the action of the actuator 45, it is possible to make the vacuum type servo system 10 of a simple construction.

It is also advantageously possible to set the movement of the slider valve 42 and accordingly the plunger 49 by suitably setting the biasing force of the key member 29. It is also possible to reduce the size of the vacuum type servo system 10 by reducing the movement of the slider valve 42 or the plunger 49.

The present invention also makes it possible to provide a vacuum type servo system 10 which can regulate the output accompanying the action of the actuator 45 to the maximum output or less.

Figure 11:
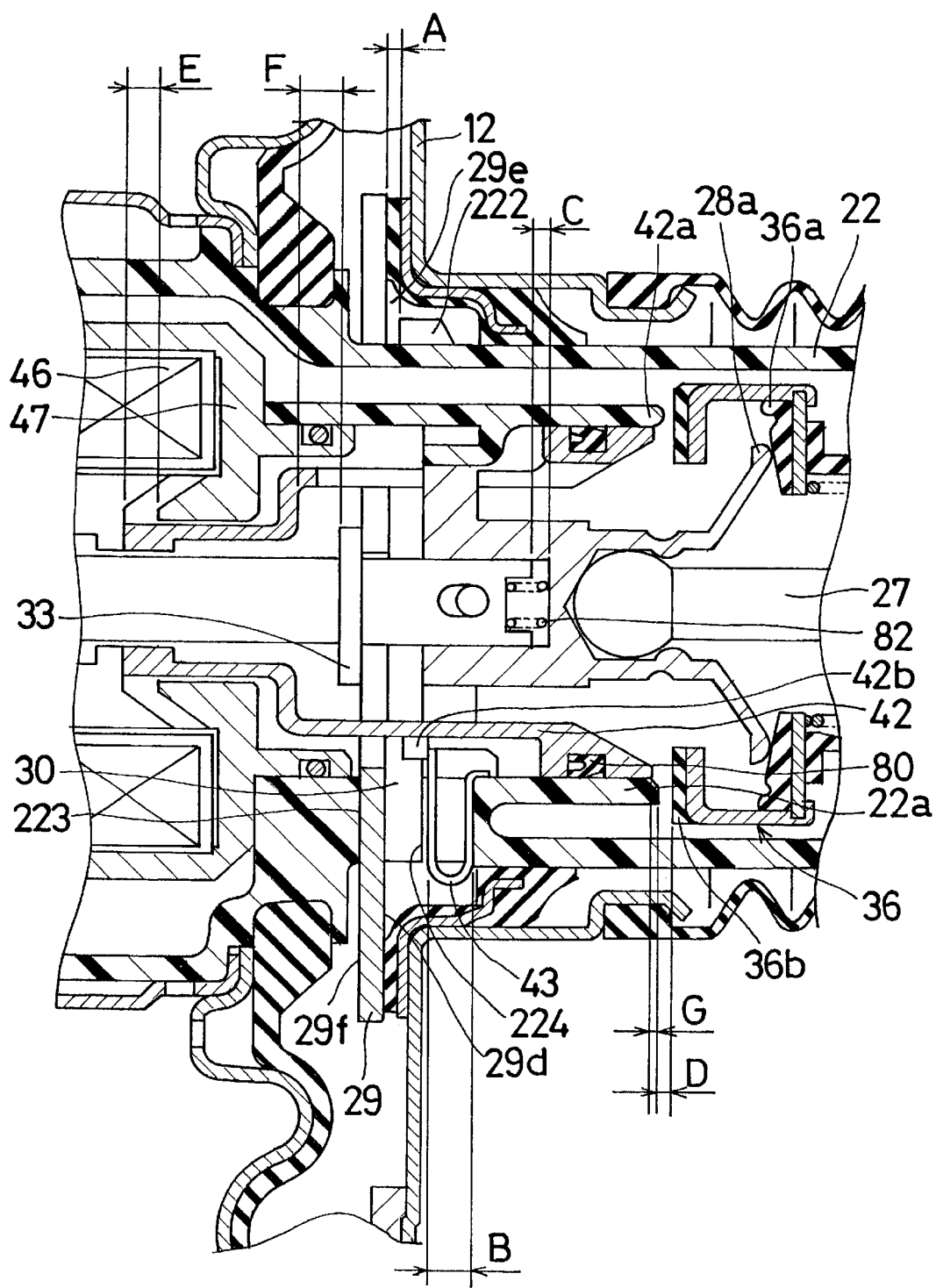
FIG. 11 is a cross-sectional view of a portion of an input member which is equipped with a rubber member in place of the spring.

In the present invention, the rubber member 81 is arranged as the second bias member. However, the invention is not limited to this construction, but similar effects can also be achieved from a vacuum type servo system in which a spring 82 is arranged in place of the rubber member 81, for example, as shown in FIG. 11.

In the present invention, the spring 43 is formed as a generally flat sheet that is curved. However, the invention is not limited in this regard as the spring 43 may be any device which is capable of biasing the slider valve 42 forward.

Although the spring 43 is described above as being arranged in the air passage 30, other constructions such as positioning the spring 43 in the radial hole 39 are possible.

The key member 29 is described above as being composed of the plate portion 29a and the arcuate portion 29b. However, other shapes for the key member that can bias the input member 28 forward when the input member 28 is moved backward by the reaction disc 52 in accordance with the action of the actuator 45 are possible.

As described above, the vacuum type servo system 10 of the present invention possesses a tandem type construction. However, the invention is not limited in this regard as the vacuum type servo system having a single type construction, for example, is also possible.

The quick braking operation has been described above in the context that the actuator 45 is not activated before the valve mechanism 35 is in the output keeping or maintaining state. However, similar advantageous effects can also be achieved from a vacuum type servo system in which the actuator 45 is activated substantially simultaneously with the depression of the brake pedal 31, for example.

In addition, while the vacuum type servo system 10 is described as being applied to the vehicle distance controlling and quick brake assisting brake system, the invention is applicable to other constructions. Similar effects can be achieved if the vacuum type servo system is applied to a brake system which requires no generation of a maximum output in the vacuum type servo system.

By virtue of the present invention, it is advantageously possible to regulate the rear chamber pressure insofar as it reaches atmospheric pressure at the time of activating the actuator. It is further possible to construct the vacuum servo apparatus in which the output to be generated according to the activation of the actuator while no input is applied to the input member is lower than that to be generated when a predetermined input is applied to the input member. It is, therefore, possible to provide a vacuum servo apparatus which can regulate the output accompanying the activation of the actuator to the maximum amount or a value less than the maximum amount.

The output to be generated according to the activation of the actuator while no input is applied to the input member can be made lower than that to be generated when a predetermined input is applied to the input member. It is also possible to make accurate relative movements of the front member and the rear member. This makes it possible to generate in a stable manner the spacing between the atmospheric valve seat and the atmospheric seal portion and produce a stable output of the vacuum type servo system.

The present invention also provides a better mode for the second joint mechanism. Also, the present invention allows the rear member to be reliably moved to the rearmost position with respect to the front member. It is also possible in accordance with the present invention to suppress the chattering between the front member and the rear member.

By virtue of the present invention, the input applied to the input member can be reliably transmitted to the reaction member. Also, the output to be generated according to the activation of the actuator can be easily set by suitably setting the restoring force of the engaging member. According to the present invention, a better engaging mode is presented for the input member of the engaging member.

The present invention also allows the output generated according to the activation of the actuator to be easily set when the actuator is activated especially while no input is applied to the input member. In addition, the vacuum type servo system can be made of a simple construction by making the engaging member of the key member. Also, the present invention presents a better mode for the actuator.

The present invention is further advantageous in that the output to be generated from the output member in accordance with the activation of the actuator can be adjusted to an output better matching a given situation. Also, a better mode is presented for the actuation of the valve seat member by the actuator and a better action mode of the valve seat member is presented by the solenoid.

The present invention makes it possible to reduce the size of the vacuum type servo system. It is possible to construct the vacuum servo apparatus which is equipped with the actuator for providing communication between the rear chamber and the atmosphere by spacing the atmospheric valve seat and the atmospheric seal portion so that the output to be generated according to the activation of the actuator while no input is applied to the input member is made smaller than the output to be outputted when a predetermined input is applied to the input member. This makes it possible to provide a vacuum servo apparatus which can regulate the output accompanying the activation of the actuator to the maximum output or less.

The output to be generated according to the activation of the actuator while no input is applied to the input member can be made smaller than the output to be outputted when the predetermined input is applied to the input member. Also, by virtue of the present invention, it is possible to construct the vacuum servo apparatus in which the output to be generated according to the activation of the actuator while no input is applied to the input member is lower than that to be generated when a predetermined input is applied to the input member. Further, it is possible to regulate the rear chamber from reaching atmospheric pressure at the time of activating the actuator.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A vacuum servo apparatus comprising:
   a housing having at least one pressure chamber formed therein;
   a movable wall disposed in said housing to be movable forward and backward with respect to said housing and partitioning said pressure chamber into a front chamber communicating with a negative pressure source and a rear chamber selectively communicated with said front chamber and the atmosphere;
   a power piston joined to said movable wall;
   an input member arranged in said power piston to be movable forward and backward with respect to said power piston, said input member including a front member and a rear member separated by a clearance and movable with respect to one another to cancel said clearance;
   an atmospheric valve seat arranged in said power piston to be movable forward and backward integrally with said rear member of said input member;
   a vacuum valve seat arranged in said power piston;
   a control valve including: an atmospheric seal portion adapted to move into and out of abutment against said atmospheric valve seat for cutting off communication of said rear chamber with the atmosphere when the atmospheric seal portion comes into abutment against said atmospheric valve seat and for establishing communication of said rear chamber with the atmosphere when the atmospheric seal portion moves out of abutment against said atmospheric valve seat; and a vacuum seal portion adapted to move into and out of abutment against said vacuum valve seat for cutting off communication between said front chamber and said rear chamber when the vacuum seal portion comes into abutment against said vacuum valve seat and for establishing communication of said rear chamber with said front chamber when the vacuum seal portion moves out of abutment against said vacuum valve seat;
   an output member for outputting to outside the apparatus a forward force of said power piston in accordance with a movement of said movable wall; and
   an actuator for moving said atmospheric valve seat and said atmospheric seal portion away from each other to establish communication between said rear chamber and the atmosphere, wherein a predetermined input force applied to said input member during inactivation of said actuator produces an output force from said output member that increases to a predetermined output force, and an output force generated during activation of said actuator is controlled to be smaller than said predetermined output force.

2. A vacuum servo apparatus according to claim 1, further comprising:

a reaction member for transmitting a forward force of said power piston and an input force fed to said input member, to said output member and for applying a reaction force of a magnitude corresponding to an output force of said output member, to move said input member backward, and said atmospheric valve seat and said atmospheric seal portion can come into abutment against each other to cut off the communication between said rear chamber and the atmosphere when said input member is moved backward by a reaction force of said reaction member in accordance with the activation of said actuator.

3. A vacuum servo apparatus comprising:

a housing in which is provided at least one pressure chamber;

a movable wall disposed in the housing and partitioning said pressure chamber into a front chamber communicating with a negative pressure source and a rear chamber selectively communicated with said front chamber and the atmosphere;

a power piston joined to said movable wall to produce a forward force;

an input member arranged in said power piston for forward and backward movement with respect to the power piston and adapted to be connected to a brake pedal;

a valve mechanism for selectively establishing a first state in which the rear chamber is in communication with the front chamber and is prevented from communicating with the atmosphere and a second state in which the rear chamber is prevented from communicating with the front chamber and is in communication with the atmosphere to create a pressure differential between the rear chamber and the front chamber which moves the movable wall;

an output member for outputting to outside the apparatus a forward force of said power piston in accordance with movement of said movable wall; and an electrically operable actuator for bringing said valve mechanism into said second state during operation of the actuator, the apparatus producing a jumping output during operation of the actuator that is less than the jumping output produced during inactivation of the actuator when a force is applied to the input member as a result of operation of the brake pedal.

4. The vacuum servo apparatus according to claim 3, wherein the input member includes a front member and a rear member that are separated from one another by a clearance, the rear member moving forward relative to the front member to cancel said clearance during inactivation of the actuator when a force is applied to the input member as a result of operation of the brake pedal, and said front member moving backward during operation of the actuator.

5. The vacuum servo apparatus according to claim 4, including a reaction member for transmitting the forward force of said power piston and an input force applied to said input member to said output member and for applying a reaction force of a magnitude corresponding to an output force of said output member to move said input member backward.

6. The vacuum servo apparatus according to claim 4, wherein one of the front and rear members includes a longitudinally extending hole that is closed at one end and the other of the front and rear members includes a longitudinally extending engaging protrusion that fits within the longitudinally extending hole.

7. A vacuum servo apparatus comprising:

an operational member for receiving an input force;

a first output force generator operatively associated with said operational member for generating a first jumping output in response to operation of said operational member; and a second output force generator operable independently of operation of said operational member for generating a second jumping output that is less than the first jumping output.

8. The vacuum servo apparatus according to claim 7, wherein the first output force generator includes an input rod connected to the operational member for forward and backward movement, an input member connected to the input rod, an output rod for outputting the first and second jumping forces, and a reaction member for applying a reaction force of the output rod to move the input member backward, the input member including a front member and a rear member, with a clearance being provided between the front and rear members, said rear member moving forward during operation of said operating member to cancel said clearance and said front member moving backward during operation of said second output force generator.

9. The vacuum servo apparatus according to claim 8, wherein one of the front and rear members includes a longitudinally extending hole that is closed at one end and the other of the front and rear members includes a longitudinally extending engaging protrusion that fits within the longitudinally extending hole.

10. The vacuum servo apparatus according to claim 7, wherein the first output force generator also includes a housing in which is provided at least one pressure chamber, a movable wall disposed in the housing and partitioning the pressure chamber into a front chamber communicating with a negative pressure source and a rear chamber selectively communicated with the front chamber and the atmosphere, a power piston joined to the movable wall to produce a forward force, and a valve mechanism for selectively establishing a first state in which the rear chamber is in communication with the front chamber and is prevented from communicating with the atmosphere and a second state in which the rear chamber is prevented from communicating with the front chamber and is in communication with the atmosphere to create a pressure differential between the rear chamber and the front chamber which moves the movable wall.

11. The vacuum servo apparatus according to claim 7, wherein the second output force generator includes an electrically operable actuator.

12. A vacuum servo apparatus comprising:

a housing having at least one pressure chamber formed therein;

a movable wall disposed in the housing to be movable forward and backward with respect to said housing and partitioning said pressure chamber into a front chamber communicating with a negative pressure source and a rear chamber selectively communicated with said front chamber and the atmosphere;

a power piston joined to said movable wall;

an input member arranged in said power piston to be movable forward and backward with respect to said power piston;

an atmospheric valve seat arranged in said power piston to be movable forward and backward integrally with said input member;

a vacuum valve seat arranged in said power piston;

a control valve including: an atmospheric seal portion adapted to move into and out of abutment against said atmospheric valve seat for cutting off communication between said rear chamber and the atmosphere when the atmospheric seal portion comes into abutment against said atmospheric valve seat and for establishing communication of said rear chamber with the atmosphere when the atmospheric seal portion moves out of abutment against said atmospheric valve seat; and a vacuum seal portion adapted to move into and out of abutment against said vacuum valve seat for cutting off communication between said front chamber and said rear chamber when the vacuum seal portion comes into abutment against said vacuum valve seat and for establishing communication of said rear chamber with said front chamber when the vacuum seal portion moves out of abutment against said vacuum valve seat;

an output member for outputting to outside the apparatus a forward force of said power piston in accordance with a movement of said movable wall;

a reaction member for transmitting the forward force of said power piston and an input force fed to said input member to said output member and for applying a reaction force of a magnitude corresponding to an output force of said output member to move said input member backward; and an actuator for bringing said atmospheric valve seat and said atmospheric seal portion away from each other to establish communication between said rear chamber and the atmosphere, wherein said input member includes: a front member for coming into abutment against said reaction member; and a rear member separated from said front member by a clearance and capable of moving integrally with said atmospheric valve seat, so that when a first predetermined input force is fed to said input member, said rear member moves forward by predetermined stroke with respect to said front member so as to cancel said clearance, and so that when said front member and said rear member are integrally moved backward by a reaction of said reaction member in accordance with the activation of said actuator, said atmospheric valve seat and said atmospheric seal portion can come into abutment against each other to cut off the communication between said rear chamber and the atmosphere.

13. A vacuum servo apparatus according to claim 12, wherein said input member and said reaction member are in abutment against each other in an initial state where no input force is applied to said input member.

14. A vacuum servo apparatus according to claim 12, wherein said front member is joined to said rear member by a pin provided on one of the front and rear members that is fitted into an elongated slit in the other of the front and rear members so that when said rear member moves forward by the predetermined stroke with respect to said front member said front member and said rear member may integrally move forward.

15. A vacuum servo apparatus according to claim 14, including a longitudinally extending recess arranged in one of said front member and said rear member that is closed off at least at one side end portion thereof and an engaging portion formed on the other of said front and rear members and inserted into said recess to move longitudinally.

16. A vacuum servo apparatus according to claim 12, further comprising:
a first bias member for biasing said rear member backward.

17. A vacuum servo apparatus according to claim 12, further comprising:
a second bias member arranged between said front member and said rear member for biasing said rear member backward with respect to said front member.

18. A vacuum servo apparatus according to claim 12, wherein one of said front member and said rear member includes a longitudinally extending engaging protrusion and the other of said front member and said rear member includes a longitudinally extending assembly hole that slidably receives said engaging protrusion.

19. A vacuum servo apparatus according to claim 12, further comprising: an engaging member elastically deformed when said input member is moved backward by the reaction force of said reaction member in accordance with the activation of said actuator for allowing the backward movement of said input member.

20. A vacuum servo apparatus according to claim 19, wherein said engaging member engages with said input member in accordance with the forward movement of said power piston with respect to said input member by the activation of said actuator to enable said input member and said atmospheric valve seat to move integrally with said power piston.

21. A vacuum servo apparatus according to claim 19, wherein said engaging member engages with said input member when said actuator is activated during inactivation of said input member to move said power piston forward with respect to said input member, so that said input member is moved backward by the reaction force of said reaction member against a restoring force accompanying an elastic deformation of said engaging member in accordance with the activation of said actuator during inactivation of said input member, which enables to bring said atmospheric valve seat and said atmospheric seal portion into abutment thereby to cut off communication between said rear chamber and the atmosphere.

22. A vacuum servo apparatus according to claim 19, wherein said engaging member is a key member engaging with said power piston for moving longitudinally by a first predetermined stroke with respect to said power piston and with said input member for moving longitudinally by a second predetermined stroke with respect to said input member, wherein said housing includes a first opposed portion opposed to and adapted to abut against a rear face of said key member, wherein said power piston includes: a second opposed portion opposed to and adapted to abut against a front face of said key member; and a third opposed portion opposed to and adapted to abut against the rear face of said key member, and wherein said input member includes: a fourth opposed portion opposed to and adapted to abut against the front face of said key member; and a fifth opposed portion opposed to and adapted to abut against the rear face of said key member.

23. A vacuum servo apparatus according to claim 12, further comprising:
- a valve seat member arranged to move forward and backward with respect to said power piston independently of the movements of said input member and adapted to abut against said vacuum seal portion of said control valve for cutting off the communication between said front chamber and said rear chamber,
- wherein said rear member of said input member is integrally equipped with said atmospheric valve seat, and
- wherein said actuator moves said valve seat member backward to bring said valve seat member into abutment against said vacuum seal portion and moves said vacuum seal portion backward to bring said atmospheric seal portion apart from said atmospheric valve seat thereby to establish the communication between said rear chamber and the atmosphere.

24. A vacuum servo apparatus according to claim 23, wherein a drive force of said actuator is adjustable to adjust the output force from said output member.

25. A vacuum servo apparatus according to claim 24, wherein the drive force of said actuator is adjustable to adjust a backward movement of said valve seat member with respect to said power piston.

26. A vacuum servo apparatus according to claim 23, wherein said actuator includes a solenoid connected with an electric power source for attracting and moving said valve seat member backward when said solenoid receives an electric power, so that the output force from said output member can be adjusted according to an attraction force of said solenoid.

27. A vacuum servo apparatus according to claim 26, wherein said valve seat member is adjusted in the backward movement thereof in accordance with the attraction force of said solenoid.

28. A vacuum servo apparatus according to claim 23, further comprising:
- a third bias member arranged between said valve seat member and said power piston for biasing said valve seat member forward.

* * * * *